(12) United States Patent
Ishii et al.

(10) Patent No.: US 10,755,151 B2
(45) Date of Patent: Aug. 25, 2020

(54) INKJET PRINTING APPARATUS AND CONTROL METHOD THEREFOR

(71) Applicant: CANON KABUSHIKI KAISHA, Tokyo (JP)

(72) Inventors: Daisuke Ishii, Fuchu (JP); Yoshiaki Murayama, Tokyo (JP); Shigeyasu Nagoshi, Yokohama (JP); Takeshi Murase, Yokohama (JP); Satoshi Tada, Kawasaki (JP); Kenji Kubozono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/529,196

(22) Filed: Aug. 1, 2019

(65) Prior Publication Data
US 2020/0050907 A1 Feb. 13, 2020

(30) Foreign Application Priority Data

Aug. 7, 2018 (JP) .................................. 2018-148708
Aug. 7, 2018 (JP) .................................. 2018-148709

(51) Int. Cl.
*G06F 3/12* (2006.01)
*G06K 15/02* (2006.01)
*G06K 15/10* (2006.01)

(52) U.S. Cl.
CPC ......... *G06K 15/027* (2013.01); *G06K 15/102* (2013.01); *G06K 15/1878* (2013.01)

(58) Field of Classification Search
None
See application file for complete search history.

(56) References Cited

U.S. PATENT DOCUMENTS

| 8,845,060 B2 | 9/2014 | Azuma et al. | |
| 9,028,049 B2 | 5/2015 | Azuma et al. | |
| 9,138,991 B2 | 9/2015 | Murase et al. | |
| 9,278,552 B2 | 3/2016 | Teshigawara et al. | |
| 9,340,009 B2 | 5/2016 | Murayama et al. | |
| 2011/0249062 A1 | 10/2011 | Nakano et al. | |
| 2012/0033006 A1* | 2/2012 | Murayama | B41J 2/2135 347/14 |
| 2012/0250040 A1* | 10/2012 | Yamazaki | B41J 2/2142 358/1.8 |
| 2014/0111815 A1 | 4/2014 | Teshigawara et al. | |

(Continued)

FOREIGN PATENT DOCUMENTS

JP   2012-166385 A   9/2012

OTHER PUBLICATIONS

U.S. Appl. No. 16/530,598, filed Aug. 2, 2019, Yoshiaki Murayama Shigeyasu Nagoshi Daisuke Ishii.

*Primary Examiner* — Henok Shiferaw
(74) *Attorney, Agent, or Firm* — Venable LLP

(57) ABSTRACT

An inkjet printing apparatus obtains data of a second image by correcting, using shading data, signal values of pixels in an image of a read test pattern so that a signal value of a pixel lower than a value of the shading data becomes a value corresponding to a lowest luminance; specifies an area of a pattern of each of the plurality of inks in the image of the test pattern using the data of a first image and the data of the second image; and calculates a position deviation amount of a printhead based on a position of the pattern of the specified area.

17 Claims, 29 Drawing Sheets

(56) References Cited

U.S. PATENT DOCUMENTS

| | | | |
|---|---|---|---|
| 2014/0347417 A1* | 11/2014 | Murayama | B41J 2/2146 |
| | | | 347/19 |
| 2016/0031248 A1* | 2/2016 | Ikegami | G06K 15/027 |
| | | | 347/19 |
| 2016/0031252 A1* | 2/2016 | Kubozono | B41J 2/2146 |
| | | | 347/14 |
| 2016/0297191 A1* | 10/2016 | Murasawa | B41J 2/04586 |
| 2018/0290471 A1 | 10/2018 | Kubozono et al. | |

* cited by examiner

F I G. 22
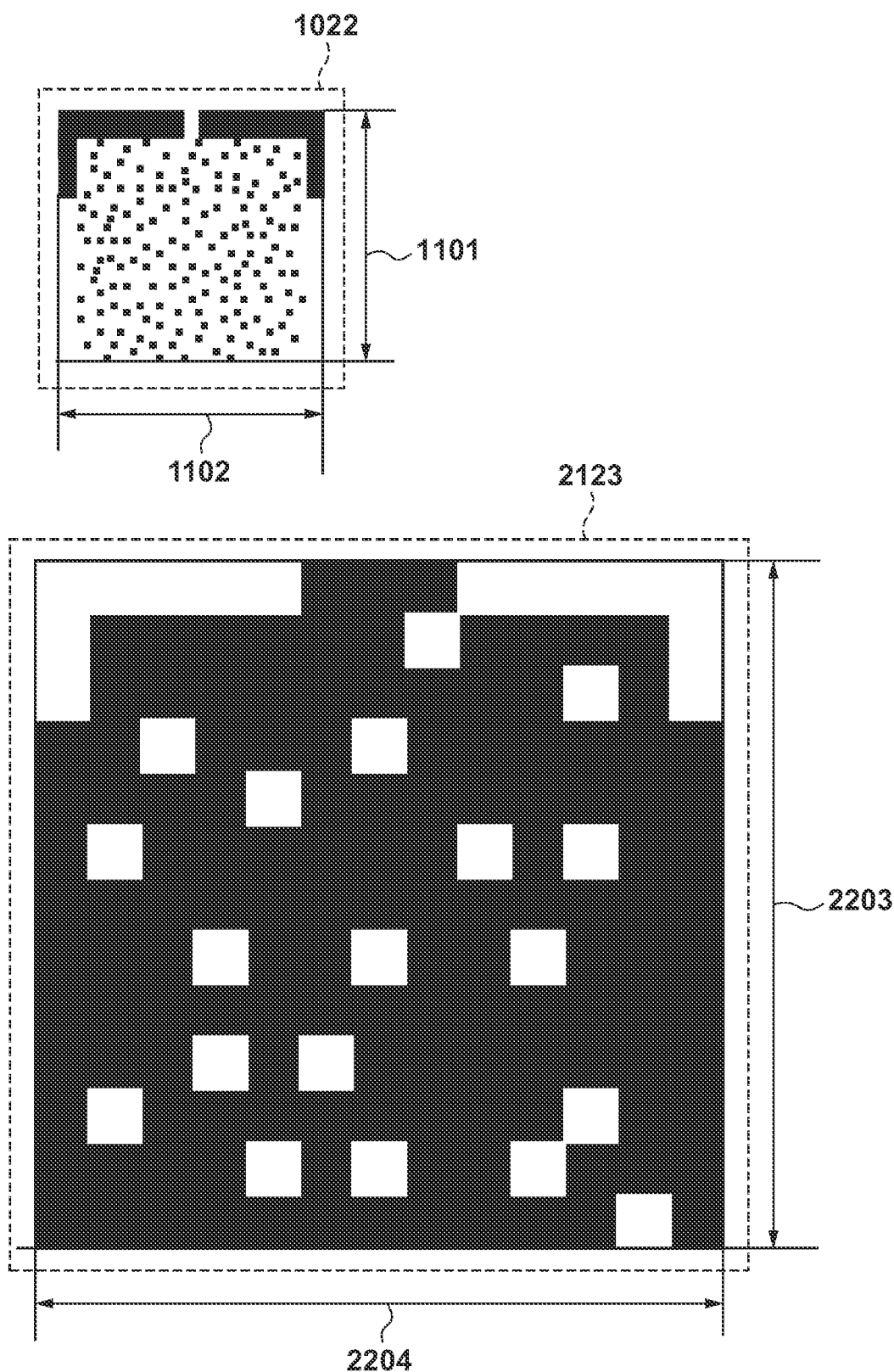

INKJET PRINTING APPARATUS AND CONTROL METHOD THEREFOR

BACKGROUND OF THE INVENTION

Field of the Invention

The present invention relates to an inkjet printing apparatus and a control method therefor.

Description of the Related Art

There is known an inkjet printing apparatus provided with a so-called full-line printhead having a print width corresponding to the width of a print medium. The inkjet printing apparatus including such printhead can print an image on almost the entire surface of the print medium by relatively moving the printhead with respect to the print medium once. In the printing apparatus provided with the full-line printhead, an error may occur in the attachment position of the printhead or the relative attachment position between a plurality of printheads. This error causes a deviation of an ink landing position (adherence position) on the print medium, thereby degrading the printing quality. Processing of correcting the deviation of the ink landing position will be referred to as "printing position adjustment" hereinafter.

For example, a printing position adjustment method disclosed in Japanese Patent Laid-Open No. 2012-166385 reads a print pattern using a reading apparatus such as a scanner and calculating a pattern position from the read image using template matching. Furthermore, the relative position between patterns is calculated and then printing position adjustment is performed based on the relative position.

However, in position detection using template matching, if a difference in luminance value between an ink color and the background color of the print medium is insufficient, an influence of the three-dimensional structure or flaw on the surface of the print medium is exerted to degrade the pattern detection accuracy.

SUMMARY OF THE INVENTION

The present invention provides a technique in which even if a difference in luminance value between ink and the background color of a print medium is small, the accuracy of printing position adjustment is improved by accurately detecting a pattern printed by ink.

According to one aspect of the present invention, there is provided an inkjet printing apparatus comprising: a printhead adopting an inkjet printing method; a reading unit configured to read an image; a first creation unit configured to create first shading data using data of an image obtained by reading a white reference by the reading unit; a first obtaining unit configured to obtain data of a first image by reading, by the reading unit, a test pattern formed using a plurality of inks on a print medium by the printhead and correcting signal values of pixels in an image of the test pattern using the first shading data; a second obtaining unit configured to obtain data of an image of a background of the print medium by reading the print medium by the reading unit; a third obtaining unit configured to obtain data of an image formed by a predetermined ink among the plurality of inks by reading the test pattern by the reading unit; a second creation unit configured to create, using the data of the image of the background and the data of the image formed by the predetermined ink, second shading data having a value between a value of the data of the image of the background and a value of the data of the image formed by the predetermined ink; a fourth obtaining unit configured to obtain data of a second image by correcting, using the second shading data, the signal values of pixels in the image of the test pattern read by the reading unit so that the signal value of a pixel lower than a value of the second shading data becomes a value corresponding to a lowest luminance; a specifying unit configured to specify an area of a pattern of each of the plurality of inks in the image of the test pattern using the data of the first image and the data of the second image; and a calculation unit configured to calculate a position deviation amount of the printhead based on a position of the pattern of the area specified by the specifying unit.

According to another aspect of the present invention, there is provided an inkjet printing apparatus comprising: a printhead adopting an inkjet printing method; a reading unit configured to read an image; a first creation unit configured to create first shading data using data of an image obtained by reading a white reference by the reading unit; a first obtaining unit configured to obtain data of an image of a background of a print medium by reading the print medium by the reading unit; a second obtaining unit configured to obtain data of an image formed by a predetermined ink among a plurality of inks by reading, by the reading unit, a test pattern formed using the plurality of inks on the print medium by the printhead; a second creation unit configured to create second shading data using the data of the image of the background and the data of the image formed by the predetermined ink; a correction unit configured to correct, with respect to the data of the image of the test pattern read by the reading unit, a signal value corresponding to a first color using the first shading data and a signal value corresponding to a second color using the second shading data so that data of a value lower than a value of the second shading data becomes a value corresponding to a lowest luminance; a specifying unit configured to specify, using the signal value corrected by the correction unit, an area of a pattern formed by each of the plurality of inks in the image of the test pattern; and a calculation unit configured to calculate a printing position deviation amount on the print medium between the plurality of inks based on a position of the pattern of the area specified by the specifying unit.

According to another aspect of the present invention, there is provided a control method for an inkjet printing apparatus including a printhead adopting an inkjet printing method and a reading unit, comprising: creating first shading data using data of an image obtained by reading a white reference by the reading unit; obtaining data of a first image by reading, by the reading unit, a test pattern formed using a plurality of inks on a print medium by the printhead and correcting signal values of pixels in an image of the test pattern using the first shading data; obtaining data of an image of a background of the print medium by reading the print medium by the reading unit; obtaining data of an image formed by a predetermined ink among the plurality of inks by reading the test pattern by the reading unit; creating, using the data of the image of the background and the data of the image formed by the predetermined ink, second shading data having a value between a value of the data of the image of the background and a value of the data of the image formed by the predetermined ink; obtaining data of a second image by correcting, using the second shading data, the signal values of pixels in the image of the test pattern read by the reading unit so that the signal value of a pixel lower than a value of the second shading data becomes a value corresponding to a lowest luminance; specifying an area of a pattern of each of the plurality of inks in the image of the test pattern using the data of the first image and the data of the second image; and calculating a position deviation amount of the printhead based on a position of the pattern of the specified area.

According to the present invention, even if a difference in luminance value between ink and the background color of a print medium is small, it is possible to accurately detect a pattern printed by ink.

Further features of the present invention will become apparent from the following description of exemplary embodiments (with reference to the attached drawings).

BRIEF DESCRIPTION OF THE DRAWINGS

FIG. 22 is a view showing patterns for pattern matching according to the second embodiment.

DESCRIPTION OF THE EMBODIMENTS

Embodiments of the present invention will be described with reference to the accompanying drawings. In each view, arrows X and Y indicate horizontal directions perpendicular to each other, and an arrow Z indicates a vertical direction.

[Printing System]

Figure 1:
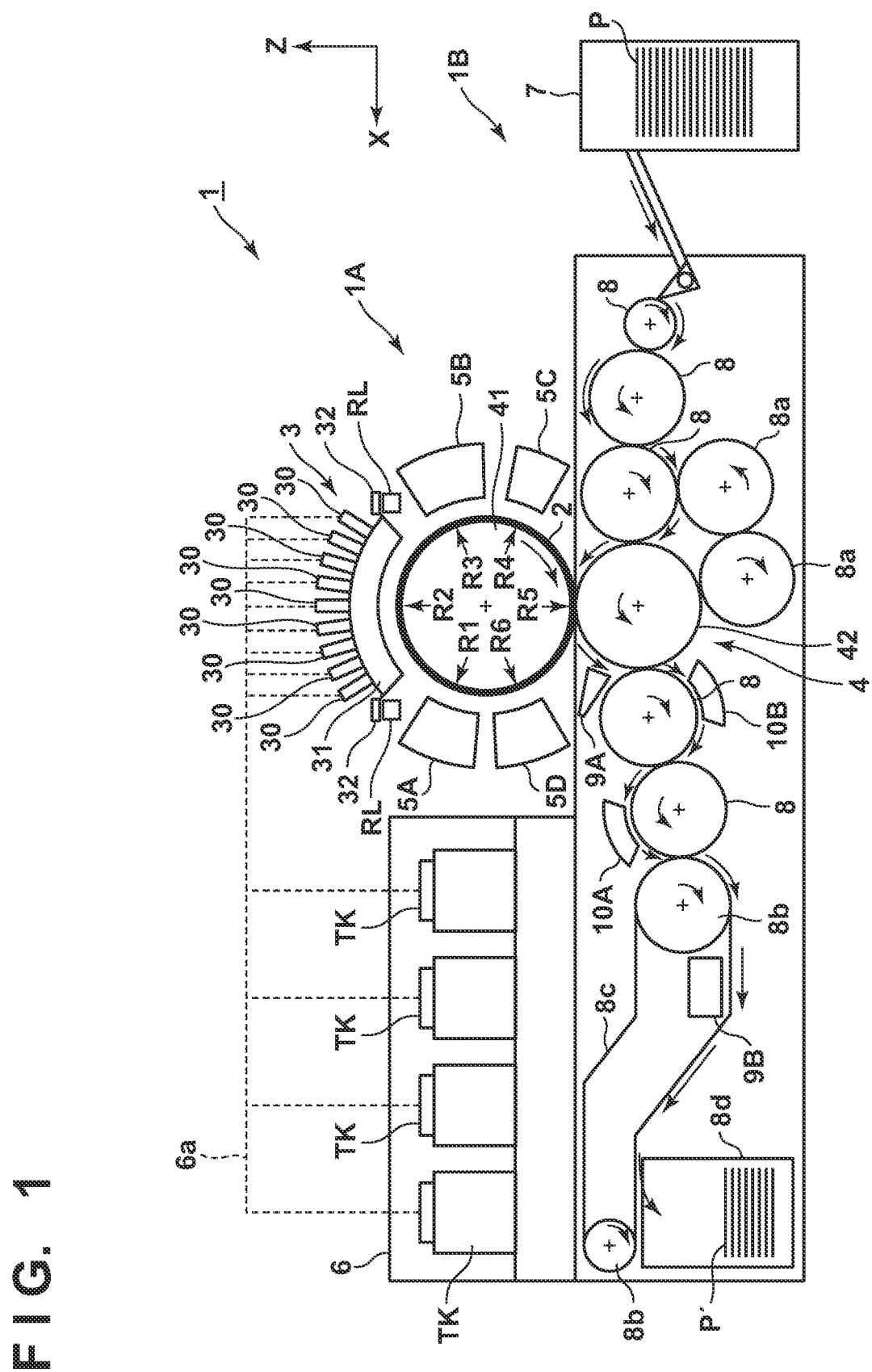
FIG. 1 is a schematic view showing a printing system.

FIG. 1 is a front view schematically showing a printing system 1 according to an embodiment of the present invention. The printing system 1 is a sheet inkjet printer that forms a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

Note that "print" includes not only formation of significant information such as a character or graphic pattern but also formation of an image, design, or pattern on a print medium in a broader sense or processing of a print medium regardless of whether the information is significant or insignificant or is prominent enough to allow human visual perception. In this embodiment, a "print medium" is assumed to be a paper sheet but may be a fabric, plastic film, or the like.

An ink component is not particularly limited. In this embodiment, however, a case is assumed in which aqueous pigment ink that includes a pigment as a coloring material, water, and a resin is used.

[Printing Apparatus]

The printing apparatus 1A serving as an inkjet printing apparatus includes a print unit 3, a transfer unit 4, peripheral units 5A to 5D, and a supply unit 6.

[Print Unit]

Figure 2:
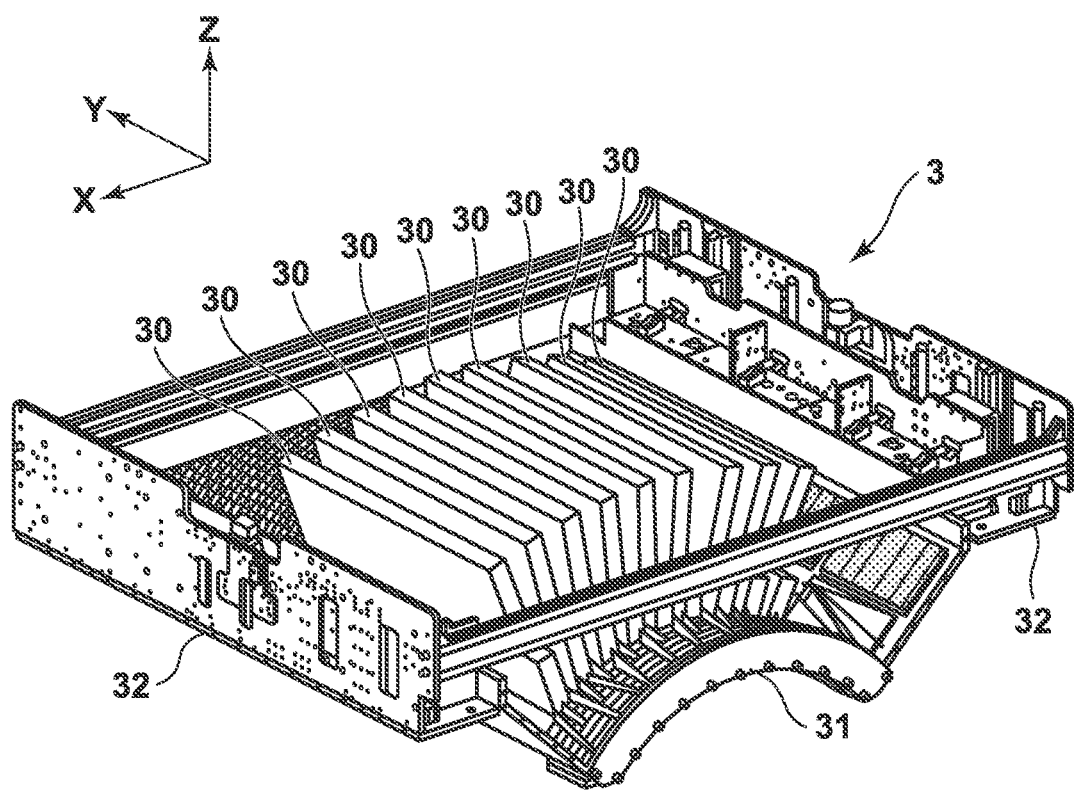
FIG. 2 is a perspective view showing a print unit.

The print unit 3 includes a plurality of printheads 30 adopting an inkjet printing method and a carriage 31. A description will be made with reference to FIGS. 1 and 2. FIG. 2 is a perspective view showing the print unit 3. The printheads 30 discharge liquid ink to the transfer member 2 and form ink images of a printed image on the transfer member 2.

In this embodiment, each printhead 30 is a full-line printhead elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet printhead in a known inkjet printer is applicable. For example, an element that discharges ink by causing film boiling in ink with an electrothermal transducer and forming a bubble, an element that discharges ink by an electromechanical transducer, an element that discharges ink by using static electricity, or the like can be given as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge ink (for example, clear ink) that does not include a coloring material.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide member RL. In this embodiment, the guide members RL are rail members elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
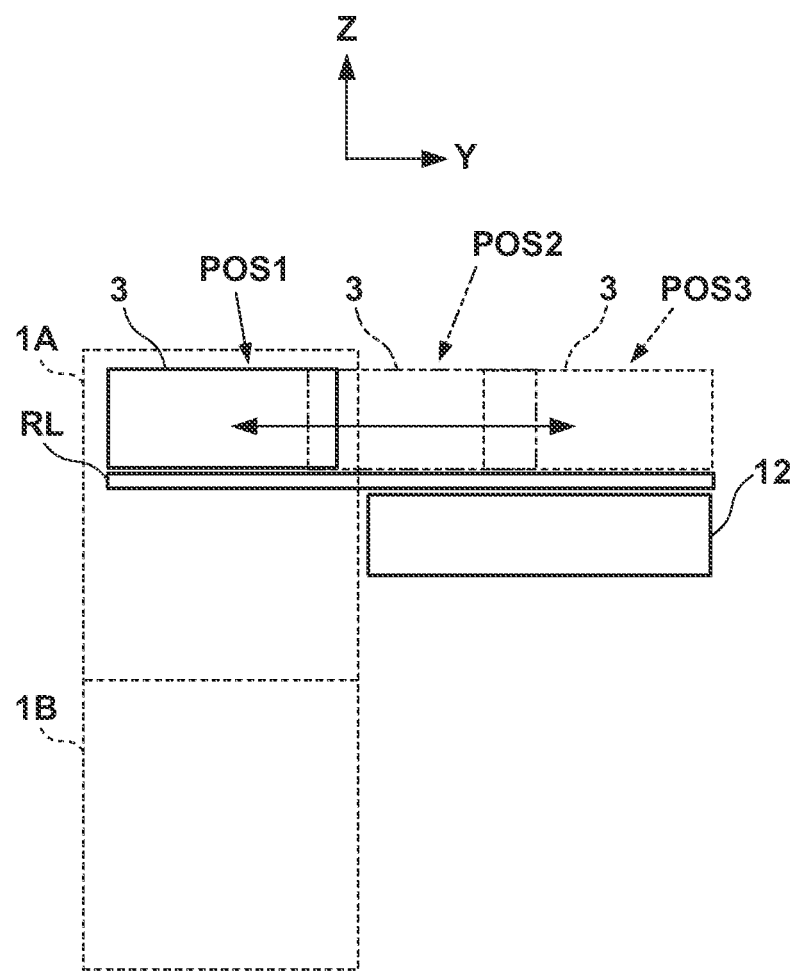
FIG. 3 is an explanatory view showing a displacement mode of the print unit shown in FIG. 2.

FIG. 3 is a view showing a displacement mode of the print unit 3 and schematically showing the right side surface of the printing system 1. A recovery unit 12 is provided in the rear of the printing system 1. The recovery unit 12 has a mechanism of recovering discharge performance of the printheads 30. For example, a cap mechanism that caps the ink discharge surface of each printhead 30, a wiper mechanism that wipes the ink discharge surface, and a suction mechanism that sucks ink in the printhead 30 by a negative pressure from the ink discharge surface can be given as such mechanisms.

The guide member RL is elongated over the recovery unit 12 from the side of the transfer member 2. By the guide of the guide member RL, the print unit 3 is displaceable between a discharge position POS1 at which the print unit 3 is indicated by a solid line and a recovery position POS3 at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is located above the recovery unit 12. The recovery unit 12 can perform recovery processing on the printheads 30 when the print unit 3 is located at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3. Note that the recovery processing may be executable individually on each of the plurality of printheads 30 or executed collectively on some of the printheads 30.

[Transfer Unit]

The transfer unit 4 will be described with reference to FIG. 1. The transfer unit 4 includes a transfer drum (transfer cylinder) 41 and a pressurizing drum 42. Each of these drums is a rotating member that rotates about a rotation axis in the Y direction and has a cylindrical outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates anticlockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends dividedly into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section in the rotation direction. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative member of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials such as a resin and a ceramic can be used appropriately. In respect of durability or the like, however, a material high in compressive modulus can be used. More specifically, an acrylic resin, an acrylic silicone resin, a fluoride-containing resin, a condensate obtained by condensing a hydrolyzable organo-silicon compound, and the like can be given. The surface layer that has undergone a surface treatment may be used in order to improve wettability of the reactive liquid, the transferability of an image, or the like. Frame processing, a corona treatment, a plasma treatment, a polishing treatment, a roughing treatment, an active energy beam irradiation treatment, an ozone treatment, a surfactant treatment, a silane coupling treatment, or the like can be given as the surface treatment. A plurality of them may be combined. It is also possible to provide an arbitrary surface shape in the surface layer.

For example, acrylonitrile-butadiene rubber, acrylic rubber, chloroprene rubber, urethane rubber, silicone rubber, or the like can be given as a material for the compressed layer. When such a rubber material is formed, a porous rubber material may be formed by blending a predetermined amount of a vulcanizing agent, vulcanizing accelerator, or the like and further blending a foaming agent, or a filling agent such as hollow fine particles or salt as needed. Consequently, a bubble portion is compressed along with a volume change with respect to various pressure fluctuations, and thus deformation in directions other than a compression direction is small, making it possible to obtain more stable transferability and durability. As the porous rubber material, there are a material having an open cell structure in which respective pores continue to each other and a material having a closed cell structure in which the respective pores are independent of each other. However, either structure may be used, or both of these structures may be used.

As a member for the elastic layer, the various materials such as the resin and the ceramic can be used appropriately. In respect of processing characteristics, various materials of an elastomer material and a rubber material can be used. More specifically, for example, fluorosilicone rubber, phenyl silicon rubber, fluorine rubber, chloroprene rubber, urethane rubber, nitrile rubber, and the like can be given. In addition, ethylene propylene rubber, natural rubber, styrene rubber, isoprene rubber, butadiene rubber, the copolymer of ethylene/propylene/butadiene, nitrile-butadiene rubber, and the like can be given. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41. Woven fabric may be used as a reinforce layer. The transfer member 2 can be manufactured by arbitrarily combining the respective layers formed by the materials described above.

The outer peripheral surface of the pressurizing drum 42 is pressed against the transfer member 2. At least one grip mechanism that grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42. The transfer drum 41 and the pressurizing drum 42 share a driving source such as a motor that drives them. A driving force can be delivered by a transmission mechanism such as a gear mechanism.

[Peripheral Unit]

The peripheral units 5A to 5D are arranged around the transfer drum 41. In this embodiment, the peripheral units 5A to 5D are an application unit, an absorption unit, a heating unit, and a cleaning unit in order.

The application unit 5A is a mechanism that applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity. This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance such as metal ions or a polymeric coagulant that causes a pH change in ink and coagulates the coloring material in the ink, and can use an organic acid. For example, a roller, a printhead, a die coating apparatus (die coater), a blade coating apparatus (blade coater), or the like can be given as a mechanism that applies the reactive liquid. If the reactive liquid is applied to the transfer member 2 before the ink is discharged to the transfer member 2, it is possible to immediately fix ink that reaches the transfer member 2. This makes it possible to suppress breeding caused by mixing adjacent inks.

The absorption unit 5B is a mechanism that absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as condensing ink that forms the ink image on the transfer member 2. Condensing the ink means increasing the content of a solid content such as a coloring material or a resin contained in the ink with respect to the liquid component by decreasing the liquid component contained in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 µm in order to suppress adherence of an ink solid content to the liquid absorbing member. The pore size here refers to an average diameter and can be measured by a known means such as a mercury intrusion technique, a nitrogen adsorption method, an SEM image observation, or the like. Note that the liquid component does not have a fixed shape, and is not particularly limited if it has fluidity and an almost constant volume. For example, water, an organic solvent, or the like contained in the ink or reactive liquid can be given as the liquid component.

The heating unit 5C is a mechanism that heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism that cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, some of these units may each be provided with the cooling function of the transfer member 2 or a cooling unit may be added. In this embodiment, the temperature of the transfer member 2 may rise by heat of the heating unit 5C. If the ink image exceeds the boiling point of water as a prime solvent of ink after the print unit 3 discharges ink to the transfer member 2, performance of liquid component absorption by the absorption unit 5B may degrade. It is possible to maintain the performance of liquid component absorption by cooling the transfer member 2 such that the discharged ink is maintained below the boiling point of water.

The cooling unit may be an air blowing mechanism that blows air to the transfer member 2, or a mechanism that brings a member (for example, a roller) into contact with the transfer member 2 and cools this member by air-cooling or water-cooling. The cooling unit may be a mechanism that cools the cleaning member of the cleaning unit 5D. A cooling timing may be in a period after transfer in the transfer area R5 before application of the reactive liquid in the processing area R1 before discharge.

[Supply Unit]

The supply unit 6 is a mechanism that supplies ink to each printhead 30 of the print unit 3. The supply unit 6 may be provided on the rear side of the printing system 1. The supply unit 6 includes a reservoir TK that reserves ink for each kind of ink. Each reservoir TK may include a main tank and a sub tank. In the reservoirs TK, for the respective kinds of inks, tanks of different sizes may be used and different numbers of tanks may be provided. Each reservoir TK and a corresponding one of the printheads 30 communicate with each other by a liquid passageway 6a, and ink is supplied from the reservoir TK to the printhead 30. The liquid passageway 6a may circulate ink between the reservoirs TK and the printheads 30. The supply unit 6 may include, for example, a pump that circulates ink. A deaerating mechanism that deaerates bubbles in ink may be provided in the middle of the liquid passageway 6a or in each reservoir TK. A valve that adjusts the fluid pressure of ink and an atmospheric pressure may be provided in the middle of the liquid passageway 6a or in each reservoir TK. The heights of each reservoir TK and each printhead 30 in the Z direction may be designed such that the liquid surface of ink in the reservoir TK is located lower than the ink discharge surface of the printhead 30.

[Conveyance Apparatus]

The conveyance apparatus 1B is an apparatus that feeds the print medium P to the transfer unit 4 and discharges, from the transfer unit 4, the printed product P' to which the ink image is transferred. The conveyance apparatus 1B includes a feeding unit 7, a plurality of conveyance drums 8 and 8a, two sprockets 8b, a chain 8c, and a collection unit 8d. In FIG. 1, an arrow inside a view of each constituent element in the conveyance apparatus 1B indicates a rotation direction of the constituent element, and an arrow outside the view of each constituent element indicates a conveyance path of the print medium P or the printed product P'. The print medium P is conveyed from the feeding unit 7 to the transfer unit 4, and the printed product P' is conveyed from the transfer unit 4 to the collection unit 8d. The side of the feeding unit 7 may be referred to as an upstream side in a conveyance direction, and the side of the collection unit 8d may be referred to as a downstream side.

The feeding unit 7 includes a stacking unit where the plurality of print media P are stacked and a feeding mechanism that feeds the print media P one by one from the stacking unit to the uppermost conveyance drum 8. Each of the conveyance drums 8 and 8a is a rotating member that rotates about the rotation axis in the Y direction and has a cylindrical outer peripheral surface. At least one grip mechanism that grips the leading edge portion of the print medium P (or printed product P') is provided on the outer peripheral surface of each of the conveyance drums 8 and 8a. A gripping operation and release operation of each grip mechanism may be controlled such that the print medium P is transferred between the adjacent conveyance drums.

The two conveyance drums 8a are used to invert the print medium P. When the print medium P undergoes double-sided printing, it is not transferred to the conveyance drum 8 adjacent on the downstream side but transferred to the conveyance drums 8a from the pressurizing drum 42 after transfer onto the surface. The print medium P is inverted via the two conveyance drums 8a and transferred to the pressurizing drum 42 again via the conveyance drums 8 on the upstream side of the pressurizing drum 42. Consequently, the reverse surface of the print medium P faces the transfer drum 41, transferring the ink image to the reverse surface.

The chain 8c is wound between the two sprockets 8b. One of the two sprockets 8b is a driving sprocket, and the other is a driven sprocket. The chain 8c runs cyclically by rotating the driving sprocket. The chain 8c includes a plurality of grip mechanisms spaced apart from each other in its longitudinal direction. Each grip mechanism grips the end of the printed product P'. The printed product P' is transferred from the conveyance drum 8 located at a downstream end to each grip mechanism of the chain 8c, and the printed product P' gripped by the grip mechanism is conveyed to the collection unit 8d by running the chain 8c, releasing gripping. Consequently, the printed product P' is stacked in the collection unit 8d.

[Post Processing Unit]

The conveyance apparatus 1B includes post processing units 10A and 10B. The post processing units 10A and 10B are mechanisms that are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. For example, coating that aims at protection, glossy, and the like of an image on the image printed surface of the printed product P' can be given as one type of processing content. For example, liquid application, sheet welding, lamination, and the like can be given as coating content.

[Inspection Unit]

The conveyance apparatus 1B includes inspection units 9A and 9B. The inspection units 9A and 9B are mechanisms that are arranged on the downstream side of the transfer unit 4, and inspect the printed product P'.

In this embodiment, the inspection unit 9A is an image capturing apparatus that captures an image printed on the printed product P' and includes an image sensor (not shown), for example, a CCD sensor, a CMOS sensor, or the like. The inspection unit 9A captures a printed image while a printing operation is performed continuously. Based on the image captured by the inspection unit 9A, it is possible to confirm a time-over change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined number of sheets.

In this embodiment, the inspection unit 9B is also an image capturing apparatus that captures an image printed on the printed product P' and includes an image sensor (not shown), for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8c. When the inspection unit 9B captures the printed image, it captures the entire image by temporarily suspending the run of the chain 8c. The inspection unit 9B may be a scanner that scans the printed product P'.

[Control Unit]

Figure 4:
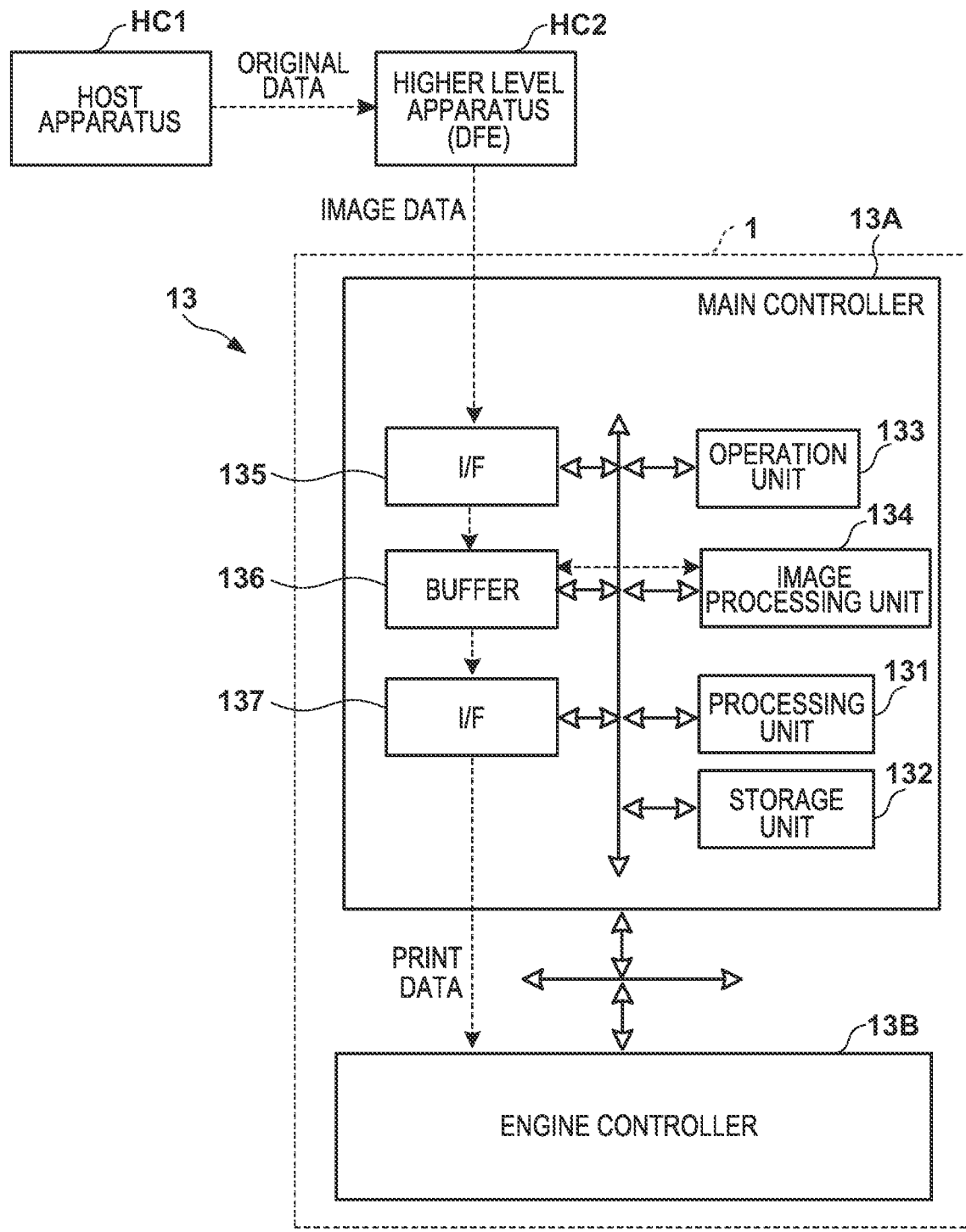
FIG. 4 is a block diagram showing a control system of the printing system shown in FIG. 1.
Figure 5:
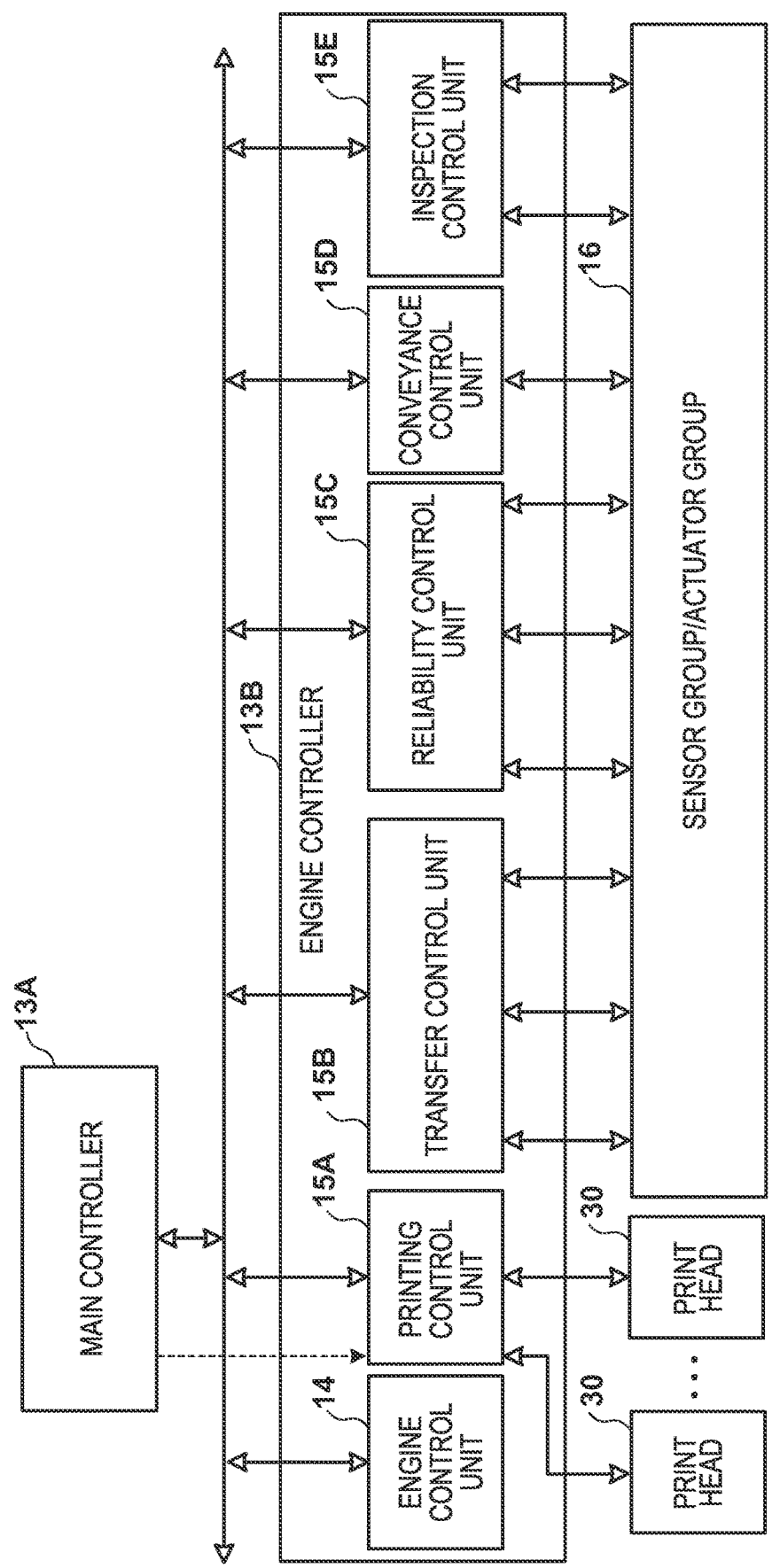
FIG. 5 is a block diagram showing the control system of the printing system shown in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the CPU 131, and provides the CPU 131 with a work area. The operation unit 133 is, for example, an input device such as a touch panel, a keyboard, or a mouse and accepts a user instruction.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 5, the engine controller 13B includes control units 14 and 15A to 15E, and obtains a detection result of a sensor group/actuator group 16 of the printing system 1 and performs driving control. Each of these control units includes a processor such as a CPU, a storage device such as a RAM or a ROM, and an interface with an external device. Note that the division of the control units is an example, and a plurality of subdivided control units may perform some of control operations or conversely, the plurality of control units may be integrated with each other, and one control unit may be configured to implement their control content.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism that moves the print unit 3 between the discharge position POS1 and the recovery position POS3.

The conveyance control unit 15D controls driving of the transfer unit 4 and controls the conveyance apparatus 1B. The inspection control unit 15E controls the inspection units 9B and 9A.

Of the sensor group/actuator group 16, the sensor group includes a sensor that detects the position and speed of a movable part, a sensor that detects a temperature, and an image sensor. The actuator group includes a motor, an electromagnetic solenoid, and an electromagnetic valve.

[Operation Example]

Figure 6:
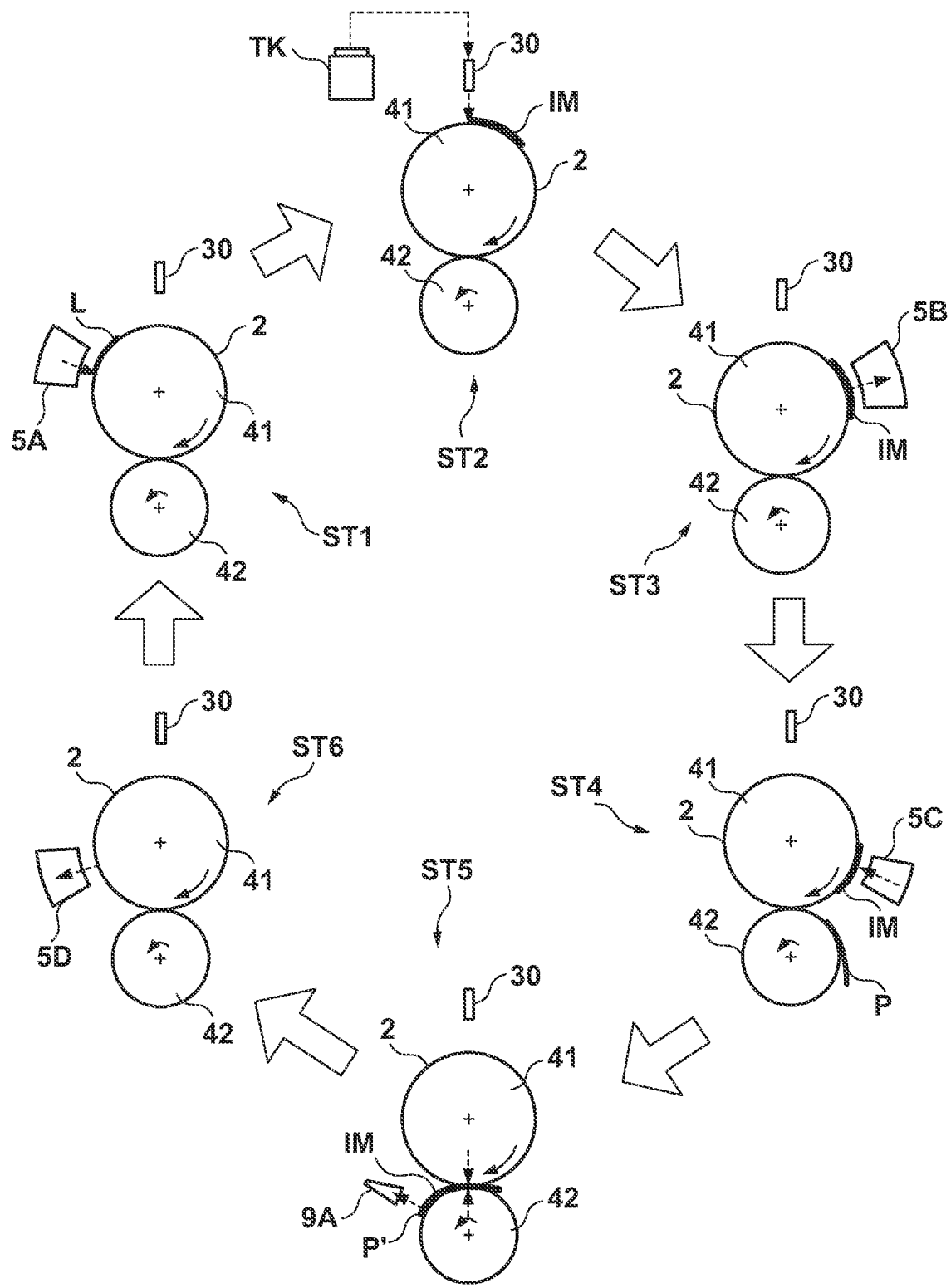
FIG. 6 is an explanatory view showing an example of the operation of the printing system shown in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion, on the transfer member 2, to which the reactive liquid L is applied, moves along with the rotation of the transfer drum 41. When the portion to which the reactive liquid L is applied reaches under the printhead 30, ink is discharged from the printhead 30 to the transfer member 2, as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8d.

When a portion, on the transfer member 2, where the ink image IM is formed reaches the cleaning unit 5D, it is cleaned by the cleaning unit 5D, as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for easy understanding. It is possible, however, to continuously perform transfer of the ink image IM to the plurality of print media P in one rotation of the transfer member 2.

Figure 7:
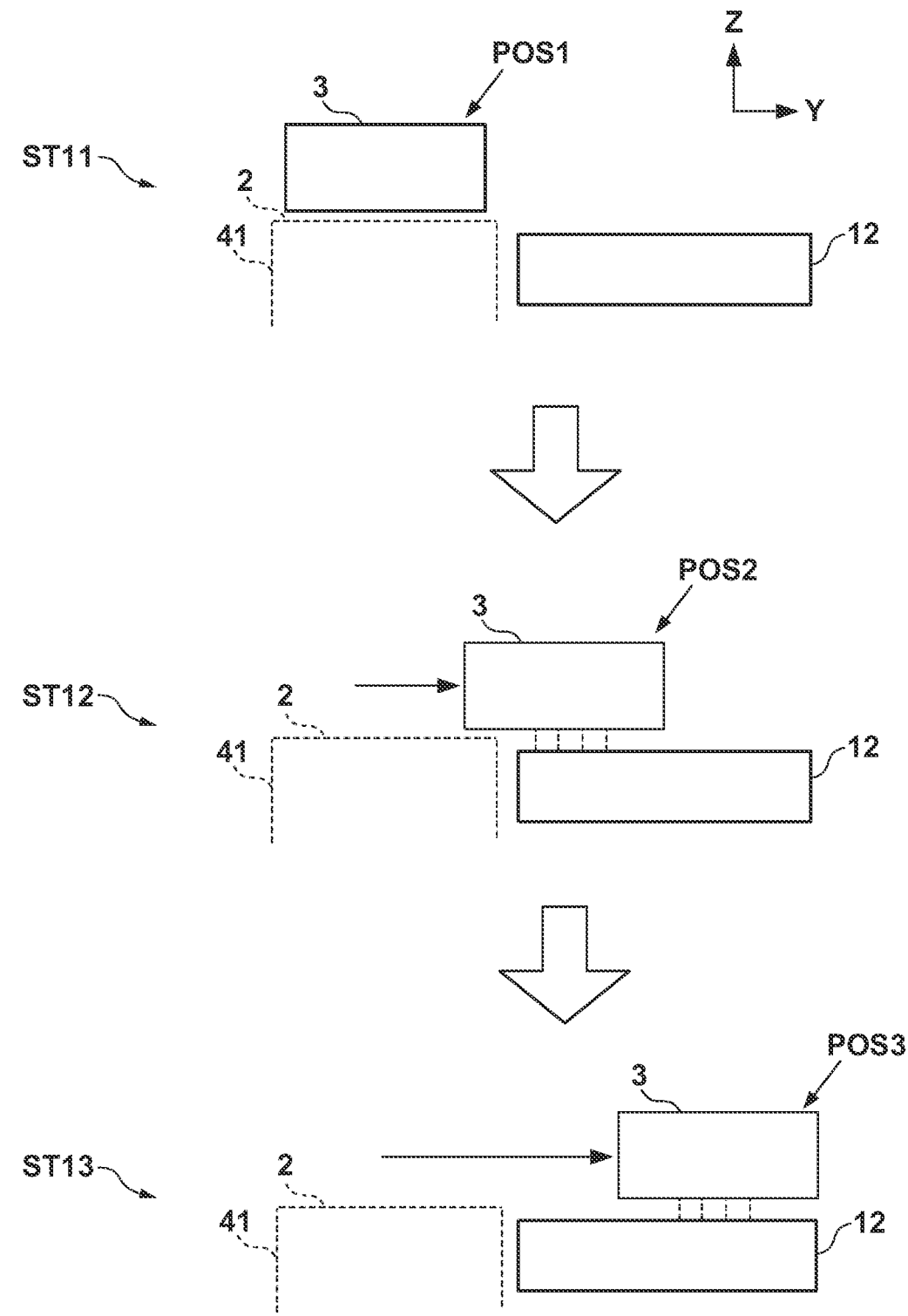
FIG. 7 is an explanatory view showing an example of the operation of the printing system shown in FIG. 1.

Each printhead 30 needs maintenance if such a printing operation continues. FIG. 7 shows an operation example at the time of maintenance of each printhead 30. The arrangement shown in FIG. 7 corresponds to the arrangement shown in FIG. 3. A state ST11 shows a state in which the print unit 3 is located at the discharge position POS1. A state ST12 shows a state in which the print unit 3 passes through the preliminary recovery position POS2. Under passage, the recovery unit 12 performs processing of recovering discharge performance of each printhead 30 of the print unit 3. Subsequently, as shown in a state ST13, the recovery unit 12 performs the processing of recovering the discharge performance of each printhead 30 in a state in which the print unit 3 is located at the recovery position POS3.

Figure 8:
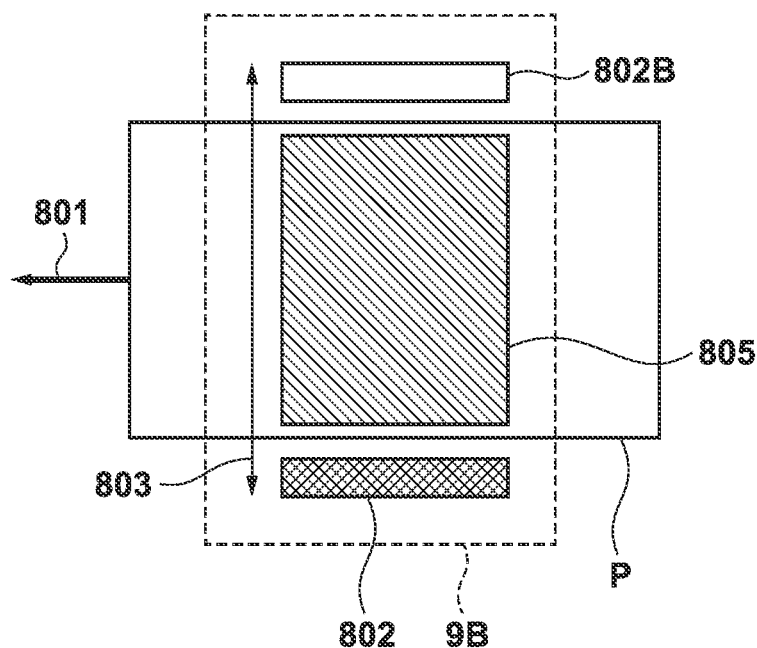
FIG. 8 is a schematic view showing an inspection unit 9B shown in FIG. 1.
Figure 9:
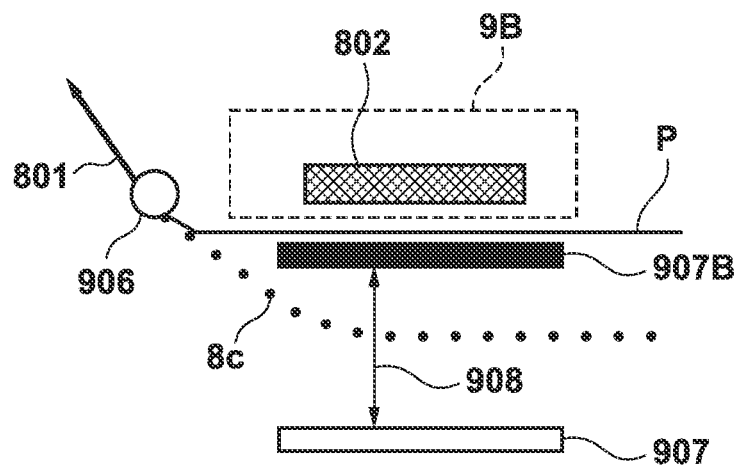
FIG. 9 is a schematic view showing the inspection unit 9B shown in FIG. 1.

FIG. 8 shows the inspection unit 9B and its peripheral arrangement when viewed from above the apparatus. FIG. 9 shows the inspection unit 9B and its peripheral arrangement when viewed from the front side of the apparatus.

The print medium P is conveyed in a conveyance direction 801 to stop near the inspection unit 9B, and an image is captured using a CCD sensor 802 capable of scanning in a widthwise direction 803 perpendicular to the conveyance direction 801. The leading end of the print medium P is nipped by a grip mechanism 906 arranged in the chain 8c, and the chain 8c runs cyclically, thereby conveying the print medium P to the inspection unit 9B. When capturing an imaging area 805, an elevating base 907 that can be driven in a vertical direction 908 is moved to a pressing position 907B to move the print medium P closer to the CCD sensor 802, thereby capturing an image. Note that in image capturing, instead of stopping conveyance, the CCD sensor 802 may be arranged in a direction perpendicular to the conveyance direction and an image may be captured while decreasing the conveyance speed.

First Embodiment

[Position Deviation Correction Method for Printhead]

Figure 10:
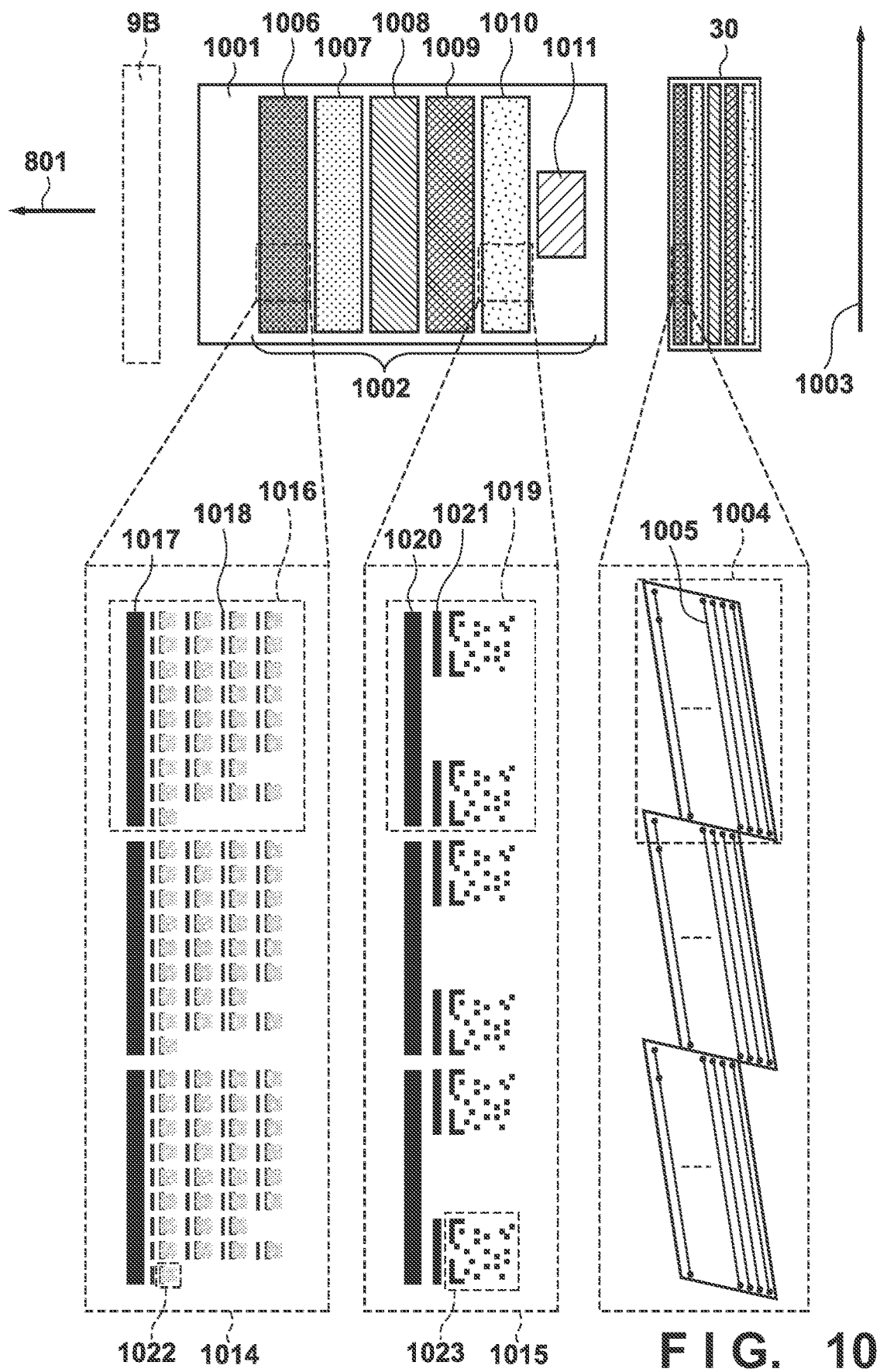
FIG. 10 is a view for explaining a test pattern for printhead position deviation correction according to the first embodiment.

FIG. 10 is a view for explaining a test pattern for position deviation correction of the printhead according to this embodiment.

FIG. 10 shows an example of printing a test pattern 1002 for printhead position deviation correction using a cut sheet as a print medium 1001. Note that the test pattern fits in one cut sheet used here but a plurality of test patterns may be printed depending on the size of a cut sheet. A nozzle array direction 1003 indicates the nozzle array direction of a printhead 30. That is, the nozzle array direction 1003 corresponds to the Y direction in FIG. 2.

As shown in FIG. 2, there are provided the plurality of printheads 30. Assume that the printheads correspond to five colors of K (black), M (magenta), C (cyan), Y (yellow), and clear inks, respectively, from the downstream side in the conveyance direction of the print medium 1001. The color order of the printheads 30 may change, printheads corresponding to other colors such as G (gray), LM (light magenta), and LC (light cyan) may be added, or the printheads may change.

An inspection unit 9B is arranged on the downstream side in the conveyance direction of the print medium 1001 with respect to the printheads 30. The inspection unit 9B reads the test pattern 1002 printed on the print medium 1001 to detect position deviation amounts of the printheads 30.

Each printhead 30 is formed by a plurality of print chips, and a print chip 1004 corresponds to one print chip. This embodiment shows an example in which one print chip is formed in a parallelogram shape. In this embodiment, 36 print chips 1004 are arranged in the nozzle array direction 1003 in each printhead 30. However, the number of print chips may change. The nozzle array direction 1003 corresponds to a widthwise direction 803 shown in FIG. 8. In each print chip 1004, a plurality of nozzle arrays 1005 are arranged. In this embodiment, 24 nozzle arrays 1005 are arranged in each print chip 1004 but the number of arrays may change. In this embodiment, as shown in FIG. 10, the nozzle arrays 1005 are arrayed in each print chip 1004 to form a predetermined angle with respect to the conveyance direction. The end portions of the nozzle arrays 1005 are arranged to generate a tilt with respect to the conveyance direction.

The types of printhead position deviations will be described. These deviations are caused by a manufacturing error of a chip or nozzle of the printhead 30, an arrangement error of the printhead 30, or the like. The types of deviations include an inter-array deviation between the nozzle arrays 1005 in the print chip 1004, an inter-chip deviation between the print chips 1004, and an inter-color deviation between the printheads 30. These deviations cause an ink droplet ejection position to deviate from an ideal position, thereby deteriorating the quality of a printed image. Printhead position deviation correction is a function of correcting an ink droplet ejection position by changing the ink discharge timing of the print chip 1004 or a discharge nozzle.

In this embodiment, with respect to a deviation in a direction (conveyance direction 801) perpendicular to the nozzle array direction 1003, a position deviation is corrected by changing the discharge timing of each print chip 1004 forming the printhead 30. With respect to a deviation in the nozzle array direction 1003, a position deviation is corrected by changing discharge data. With respect to the tilt of the printhead 30, a position deviation is corrected by rotating the printhead 30. This rotation corresponds to an operation of controlling the discharge direction (the normal direction of the transfer member 41) of the printhead 30 to the transfer member 41.

The test pattern 1002 is a test pattern for performing printhead position deviation correction of each printhead 30. Test patterns 1006 to 1010 are test patterns for five printheads, and each test pattern is used to detect a position deviation amount corresponding to each printhead 30. By using each of these test patterns, the tilt amount of the corresponding printhead 30, the inter-array deviation amount between the nozzle arrays of each print chip, and the inter-chip deviation amount between the print chips are calculated. In this embodiment, the test patterns 1006 to 1010 are test patterns corresponding to the printheads 30 of K ink, C ink, M ink, Y ink, and clear ink, respectively. The test patterns of the printheads 30 included in the test pattern 1002 may increase/decrease from the number corresponding to the five printheads, and the order of the test patterns may change. Therefore, the number of test patterns may change in accordance with the number of printheads 30 as targets to be tested. Furthermore, a test pattern 1011 is a test pattern used to calculate an inter-color deviation amount between the printheads 30. The test pattern 1011 will be described in detail with reference to FIG. 13.

In this embodiment, a pattern 1014 is an enlarged view of part of the test pattern 1006 corresponding to ink color K. Each of the test patterns 1007 to 1009 corresponding to ink colors C, M, and Y has the same arrangement as that of the test pattern 1006. A pattern 1015 is an enlarged view of part of the test pattern 1010 corresponding to clear ink. Note that the present invention is not limited to the example shown in FIG. 10, and the correspondence between each test pattern and each ink color according to the type of the printhead 30 may be changed.

In this embodiment, since enlarged patterns are used for the pattern 1015, as compared with the pattern 1014, even if a difference in luminance value between the background color of the print medium 1001 and clear ink as a printing material is small, it is possible to improve the detection accuracy. A pattern 1016 corresponds to one of the print chips 1004 included in the printheads of ink colors K, C, M, and Y, and a pattern 1019 is a pattern corresponding to one of the print chips 1004 included in the printhead of clear ink.

In each of the patterns 1014 and 1015, an area represented by black is an area printed by corresponding ink. An area represented by white is an area printed not by ink but by the background color of the print medium 1001.

Each printhead 30 according to this embodiment has the arrangement in which the plurality of print chips 1004 are linearly arranged in the nozzle array direction 1003. For each of the print chips 1004 forming each printhead 30, the pattern 1016 or 1019 corresponding to the print chip 1004 is linearly printed in parallel with the nozzle array direction 1003.

The arrangements of the patterns 1016 and 1019 corresponding to the print chips 1004 and a printing method will be described. One pattern 1016 corresponding to one print chip 1004 and used by the printhead 30 that discharges color ink includes a detection mark 1017, alignment marks 1018, and patterns 1022 for pattern matching. Furthermore, one pattern 1019 corresponding to one print chip 1004 and used by the printhead 30 that discharges clear ink includes a detection mark 1020, alignment marks 1021, and patterns 1023 for pattern matching.

The detection mark 1017 or 1020 is used for image analysis processing to detect the pattern corresponding to the print chip 1004 in a read image. The detection mark 1017 or 1020 is a pattern printed in a shape of a rectangular area shown in FIG. 10. In this embodiment, as described above, each print chip is formed by the plurality of nozzle arrays. The detection mark 1017 or 1020 is printed by droplet ejection by the plurality of nozzle arrays. When executing printing using the plurality of nozzle arrays, even if there is a non-discharge nozzle, a nozzle of another nozzle array ejects a droplet, and thus a defect in the detection pattern caused by the non-discharge nozzle is reduced. This makes it possible to detect the detection mark stably in image analysis processing.

Each alignment mark 1018 or 1021 is used for the image analysis processing to calculate the reference position of the analysis area of the pattern 1022 or 1023 for pattern matching. The alignment mark 1018 or 1021 is printed in a shape of a rectangular area shown in FIG. 10. The alignment mark 1018 or 1021 is printed by droplet ejection by the plurality of nozzle arrays for each pattern 1022 or 1023 for pattern matching corresponding to each nozzle array.

The patterns 1022 or 1023 for pattern matching are patterns for detecting the position deviation of each printhead 30 in the image analysis processing. The patterns 1022 or 1023 for pattern matching are used in accordance with a printing color or the type of the calculated deviation amount.

As for the pattern formed by clear ink, a signal difference in luminance value between the printing color (transparent color) and the background color of the print medium 1001 is hardly obtained. That is, it is difficult to detect a difference in luminance value between the background and ink. Therefore, in this embodiment, for clear ink, a position deviation is detected using the patterns 1023 for pattern matching as enlarged patterns as compared with the patterns 1022 for pattern matching.

Figure 11:
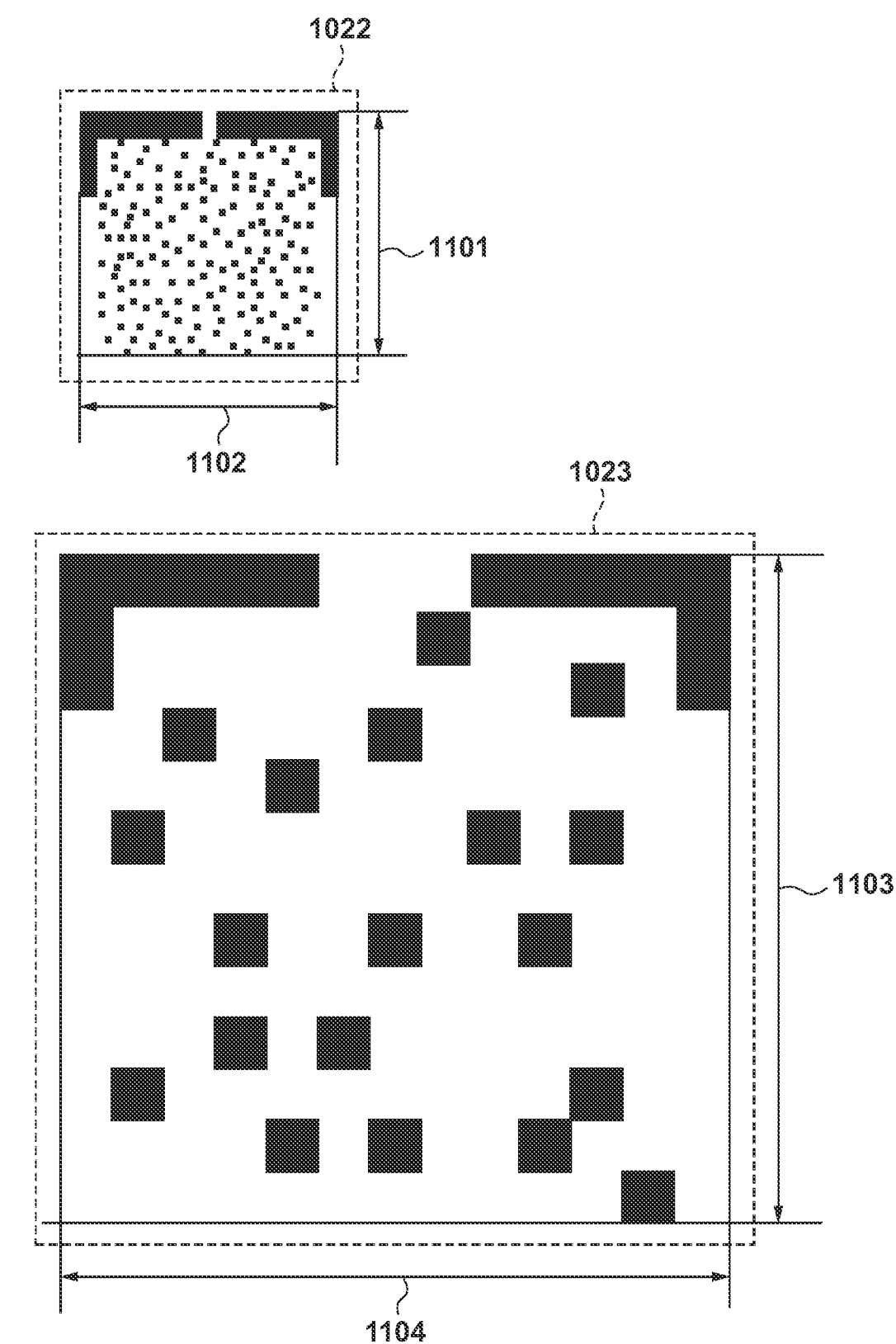
FIG. 11 is a view showing examples of patterns for pattern matching according to the first embodiment.

FIG. 11 is a view showing the detailed layouts of the patterns 1022 and 1023 for pattern matching. 1101 represents the number of pixels in the vertical direction of the pattern 1022 for pattern matching, and 1102 represents the number of pixels in the horizontal direction. 1103 represents the number of pixels in the vertical direction of the pattern 1023 for pattern matching, and 1104 represents the number of pixels in the horizontal direction.

In this embodiment, in the pattern 1022 for pattern matching, 1101 is in a direction parallel to the conveyance direction 801, and 1102 is in a direction parallel to the nozzle array direction 1003. 1101 and 1102 have a value of 82 pixels at a unit of 1,200 dpi (dot per inch). Furthermore, in the pattern 1023 for pattern matching, 1103 is in a direction parallel to the conveyance direction 801 and 1104 is in a direction parallel to the nozzle array direction 1003. 1103 and 1104 have a value of 210 pixels at a unit of 1,200 dpi. Note that the number of pixels forming each pattern for pattern matching is not limited to them, and may change. As shown in FIG. 11, the size of the pattern 1022 for pattern matching is smaller than that of the pattern 1023 for pattern matching.

Figure 12:
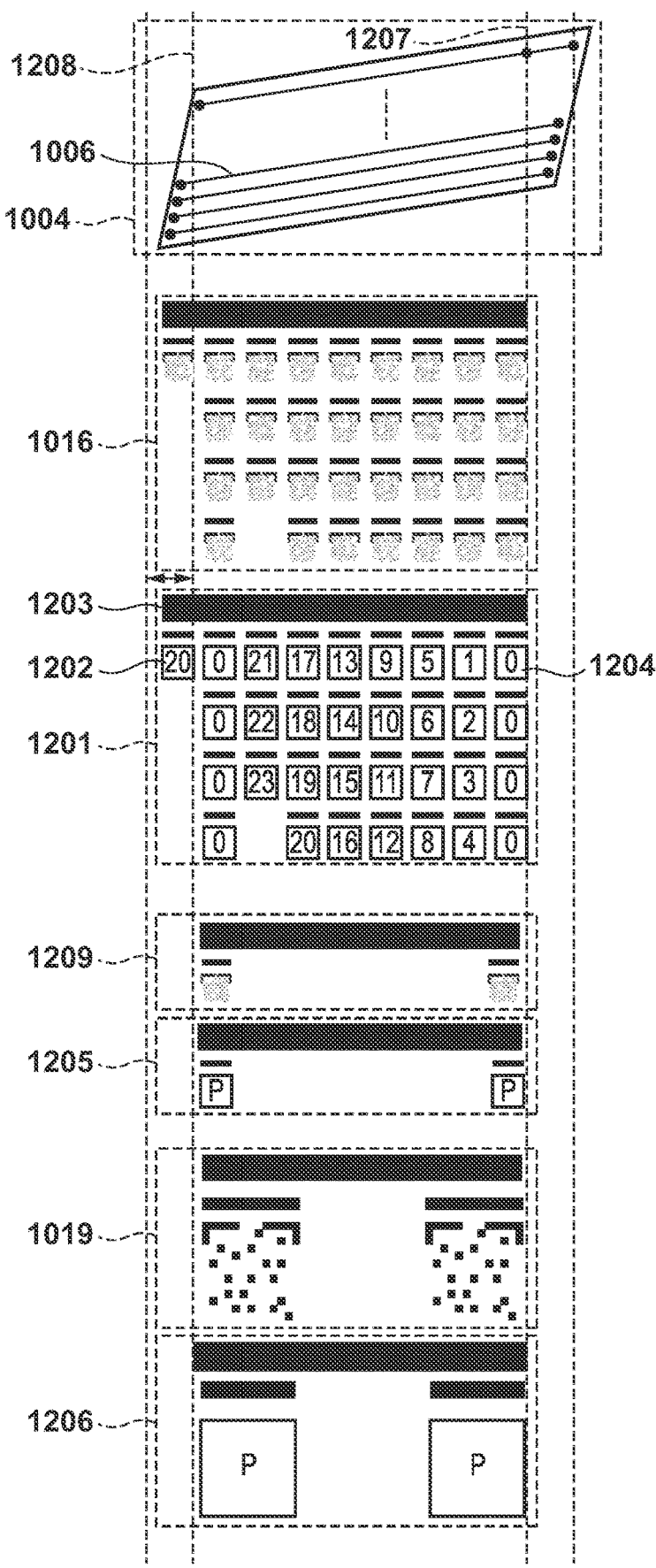
FIG. 12 is a view for explaining a pattern layout according to the first embodiment.

FIG. 12 is a view showing the correspondence between the discharge nozzles and the pattern 1016 or 1019 corresponding to one print chip 1004. Note that other print chips forming the printhead 30 have the same arrangement.

Each print chip 1004 includes the plurality of nozzle arrays 1005, and one nozzle array 1005 is formed from a plurality of nozzles. In this embodiment, 24 nozzle arrays 1005 are arranged in one print chip 1004. A test pattern for one print chip 1004 is printed by the nozzle arrays of the print chip 1004 using nozzles within a range indicated by 1207 and 1208. This range may change in accordance with the arrangement of the print chip 1004.

The patterns for pattern matching included in the pattern 1016 for one print chip 1004 are provided in correspondence with the plurality of nozzle arrays. Each of the patterns for pattern matching is printed using the nozzle array of the corresponding number. That is, patterns 0 to 23 for pattern matching are provided for the 24 nozzle arrays. In accordance with the arrangement of nozzle patterns in a layout 1201, a position deviation is calculated based on a relative position with respect to each of the remaining nozzles with reference to the pattern for pattern matching indicated by "0" (that is, the nozzle array assigned with "0"). As an exception, a pattern 1202 for pattern matching is provided. This is a pattern for pattern matching printed by the nozzle array assigned with "20" among the nozzles included in the adjacent print chip 1004 on the left. Note that the nozzle array of the adjacent print chip, that prints the pattern 1202 for pattern matching, is not limited to the nozzle array assigned with "20", and may change in accordance with the number of nozzle arrays forming the print chip 1004 or the shape of the print chip 1004.

Since the pattern 1202 for pattern matching is not a pattern printed by the self print chip, it is not used to calculate the position deviation of the nozzle array in the self print chip. One pattern 1016 is printed for one print chip 1004, and the tilt of the printhead 30 and a position deviation caused by a manufacturing error of the print chip 1004 are calculated based on one of the patterns for pattern matching for one nozzle in the print chip 1004. An inter-chip deviation between the print chips and the tilt of the printhead 30 are calculated by using, as a reference chip, the print chip corresponding to the pattern 1016 printed one pattern inside from the left or right end on the print medium 1001.

Note that in the apparatus according to this embodiment, the size of the print medium 1001 is variable. Therefore, the pattern 1016 may be printed while it lacks at the left or right end of the print medium 1001. In the case of such pattern, if the pattern is printed with a length equal to or longer than a detection mark 1203, a pattern 1204 for pattern matching at the right end and the pattern 1202 for pattern matching at the left end are selected as patterns for calculation.

Depending on the printhead, a test pattern for one print chip may have a layout of a pattern 1209 instead of the pattern 1016. Each pattern 1022 for pattern matching at this time corresponds to nozzles of a layout 1205. In the layout 1205, P indicates printing of the pattern 1022 for pattern matching by a plurality of nozzles, and is used to calculate the tilt of the printhead.

Each pattern 1023 for pattern matching of the pattern 1019 for one print chip 1004 corresponds to nozzles of a layout 1206. In the layout 1206, P indicates printing of the pattern 1023 for pattern matching by a plurality of nozzles, and is used to calculate the tilt of the printhead.

The pattern 1016 or 1023 for one print chip 1004 is printed by shifting the timing of printing on the print medium 1001 by an amount obtained by considering intersection of a manufacturing error of a nozzle and that of a chip. Therefore, overlapping of the test patterns caused by the errors is prevented.

Figure 13:
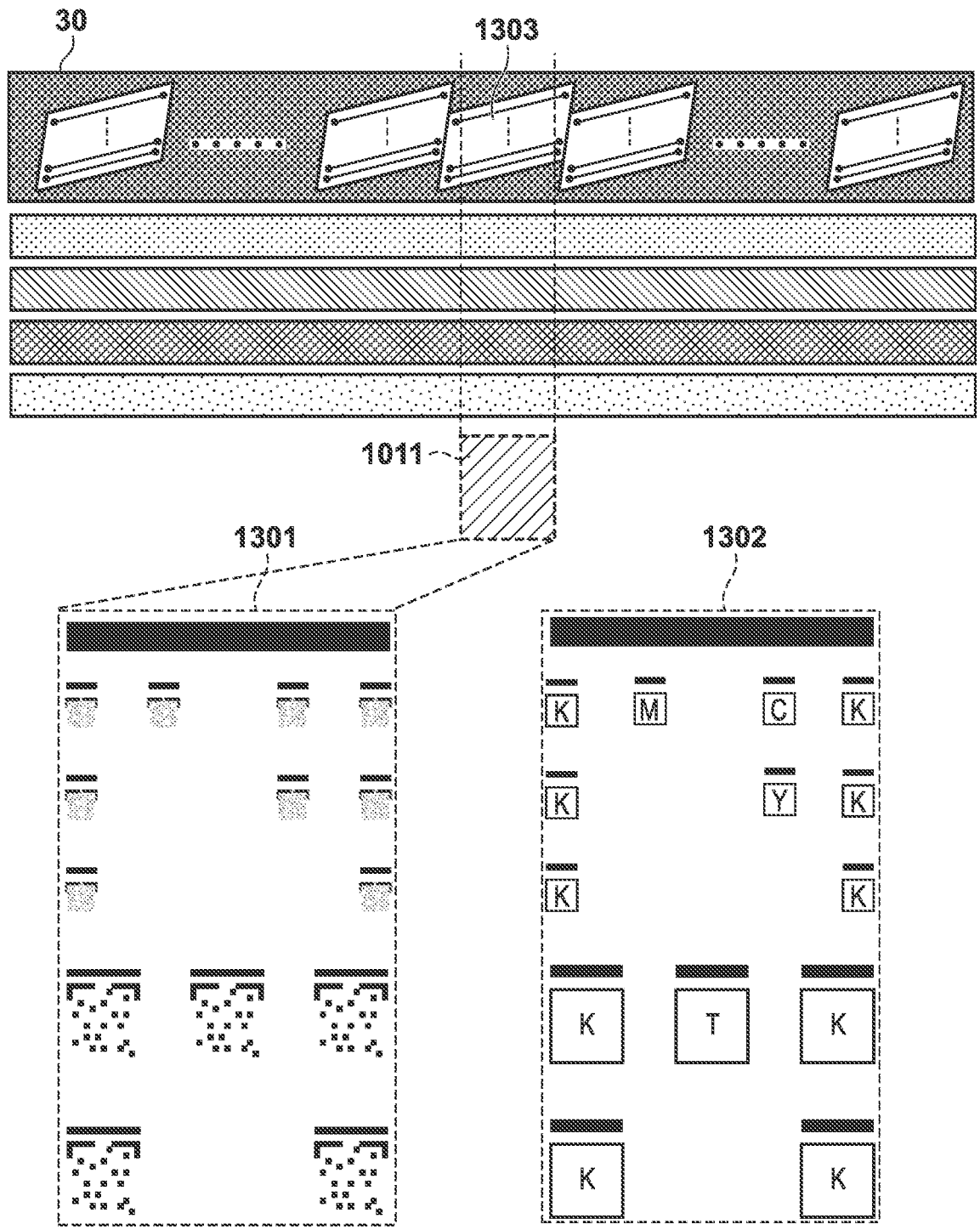
FIG. 13 is a view for explaining a pattern layout according to the first embodiment.

FIG. 13 is a view showing the correspondence among the print chips 1004 and a test pattern for performing inter-color deviation correction calculation between the printheads 30. A test pattern 1301 is a test pattern used to calculate a position error between the printheads 30. This pattern is printed by the printheads of the respective printing colors indicated by a layout 1302. In each printhead, one of the print chips 1004 to be used to print the pattern is selected. In this example, the print chip at the position of a print chip 1303 in each printhead is selected. In this embodiment, the pattern is printed using the print chip 1303. In the test pattern 1301, a portion represented by black is a portion of a pattern printed by a corresponding printing color (ink), and a portion represented by white is a portion of the paper white (background) of the print medium 1001.

In this embodiment, the pattern 1022 for pattern matching is used for K, C, M, and Y inks. The pattern 1023 for pattern matching is used for clear ink (indicated by T). As indicated by the layout 1302, the pattern is printed using printhead K as a reference printhead, and the position deviation of each printhead is calculated. As the pattern of the reference printhead, the same pattern as the pattern for pattern matching for the printing color of a deviation calculation target is used. The pattern for pattern matching corresponding to each color is not limited to that shown in FIG. 11 or 13, and a different pattern may be used.

The test pattern 1301 used to calculate the inter-color deviation between the printheads 30 is printed by shifting the timing of printing on the print medium 1001 to exceed a maximum deviation amount of the inter-color deviation between the printheads. As described above, overlapping of the test patterns is prevented by shifting the printing timing of each printhead.

(Calculation of Deviation Amount Between Nozzle Arrays)

Figure 14:
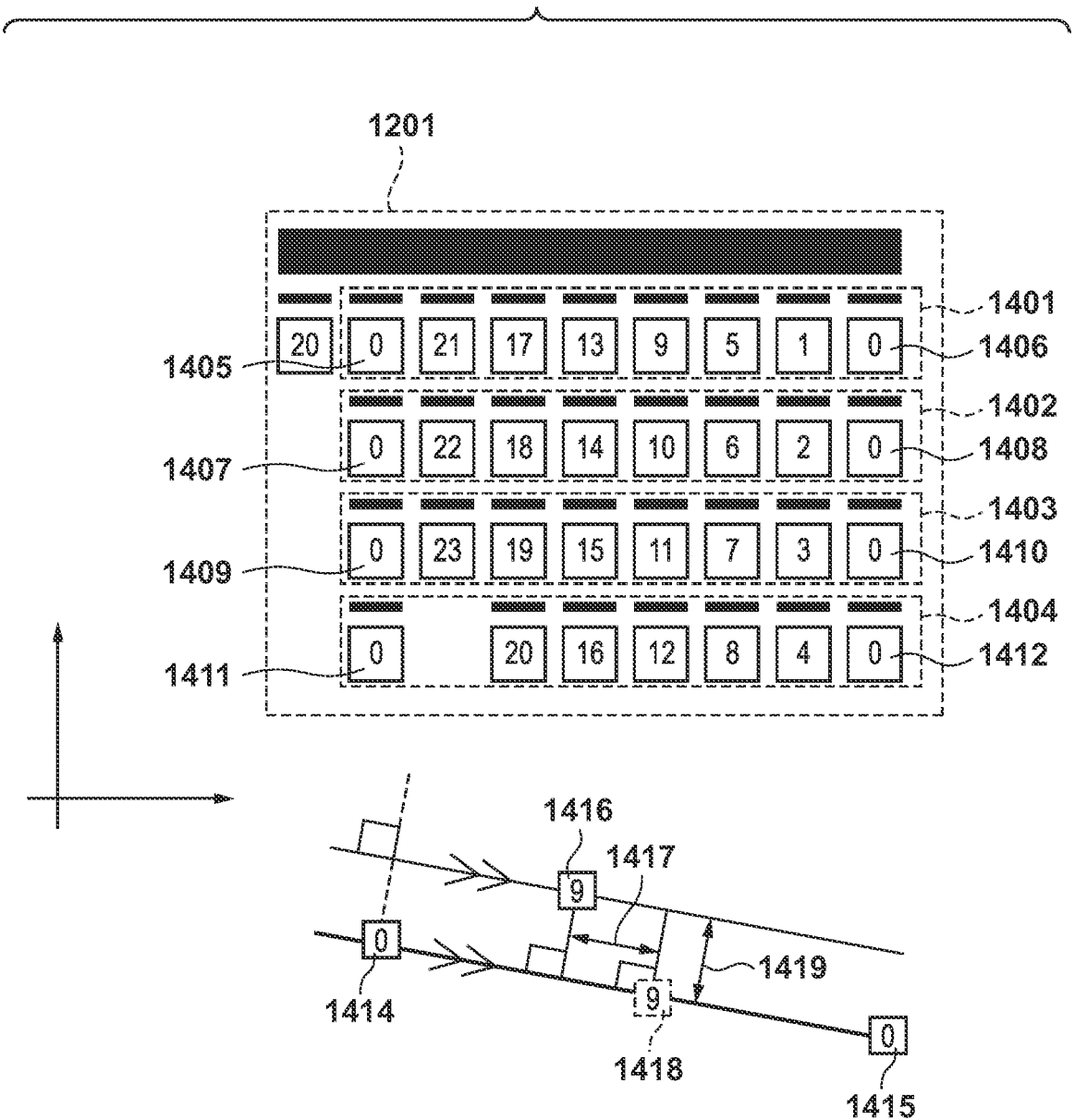
FIG. 14 is a view for explaining a method of calculating a deviation amount between nozzle arrays.

FIG. 14 is a flowchart illustrating a method of calculating a deviation amount between the nozzle arrays. As described above, in this embodiment, 24 nozzle arrays are arranged in one print chip 1004. In this example, the nozzle arrays are numbered by setting, as the 0th array, the first nozzle array from the downstream side with respect to the conveyance direction 801, and setting the last nozzle array as the 23rd array. These nozzle arrays will be referred to as nozzle arrays 0 to 23, respectively, hereinafter.

A method of calculating the deviation amount between the nozzle arrays using a scan image of a pattern printed in accordance with the layout 1201 will be described. In the layout 1201, a numerical value shown in each rectangle indicates the number of each nozzle array used to print the pattern for pattern matching. For example, it is indicated that a pattern 1405 for pattern matching is printed using nozzle array 0. A print pattern using nozzle array x will be referred to as an "array x pattern" hereinafter.

The layout 1201 is divided into four areas 1401 to 1404. In the area 1401, the array 0 pattern 1405 and an array 0 pattern 1406 are set as references. Similarly, in the areas 1402 to 1404 as well, array 0 patterns 1407 and 1408, array 0 patterns 1409 and 1410, and array 0 patterns 1411 and 1412 are set as references, respectively. In each of the areas 1401 to 1404, a deviation amount with respect to the print pattern using another nozzle array is calculated with reference to the two array 0 patterns.

As an example, a method of calculating a deviation amount between nozzle arrays 0 and 9 will be described. Print patterns 1414 and 1415 correspond to the array 0 pattern 1405 of the area 1401 and the array 0 pattern 1406 of the area 1401, respectively, and are set as references. A print pattern 1416 corresponds to an array 9 pattern printed in the area 1401. When printing the patterns by nozzle arrays 0 and 9, if there is no landing position deviation of discharged ink, the array 9 pattern is printed on a straight line connecting the print patterns 1414 and 1415. An array 9 pattern printed at an ideal position where there is no landing position deviation is indicated by a print pattern 1415. On the other hand, the actual printing position of the array 9 pattern is indicated by the print pattern 1416.

A deviation amount between the print patterns 1416 and 1418 corresponds to a position deviation amount of nozzle array 9 with respect to nozzle array 0. Assume that deviation amounts 1417 and 1419 represent the horizontal direction component and the vertical direction component of the deviation amount, respectively. The deviation amount 1419 is the length of a normal drawn from the print pattern 1416 to the straight line connecting the print patterns 1414 and 1415. Therefore, the deviation amount 1419 can be calculated from the positions of the print patterns 1414, 1415, and 1416. Similarly, the deviation amount 1417 can also be obtained from these positions.

By applying the above-described method, the deviation amounts of the array 1 pattern to the array 23 pattern are calculated with reference to the array 0 patterns, thereby obtaining the position deviation amounts of nozzle arrays 1 to 23 with respect to nozzle array 0.

(Calculation of Deviation Amount Between Print Chips and Calculation of Tilt Amount of Printhead)

Figure 15A:
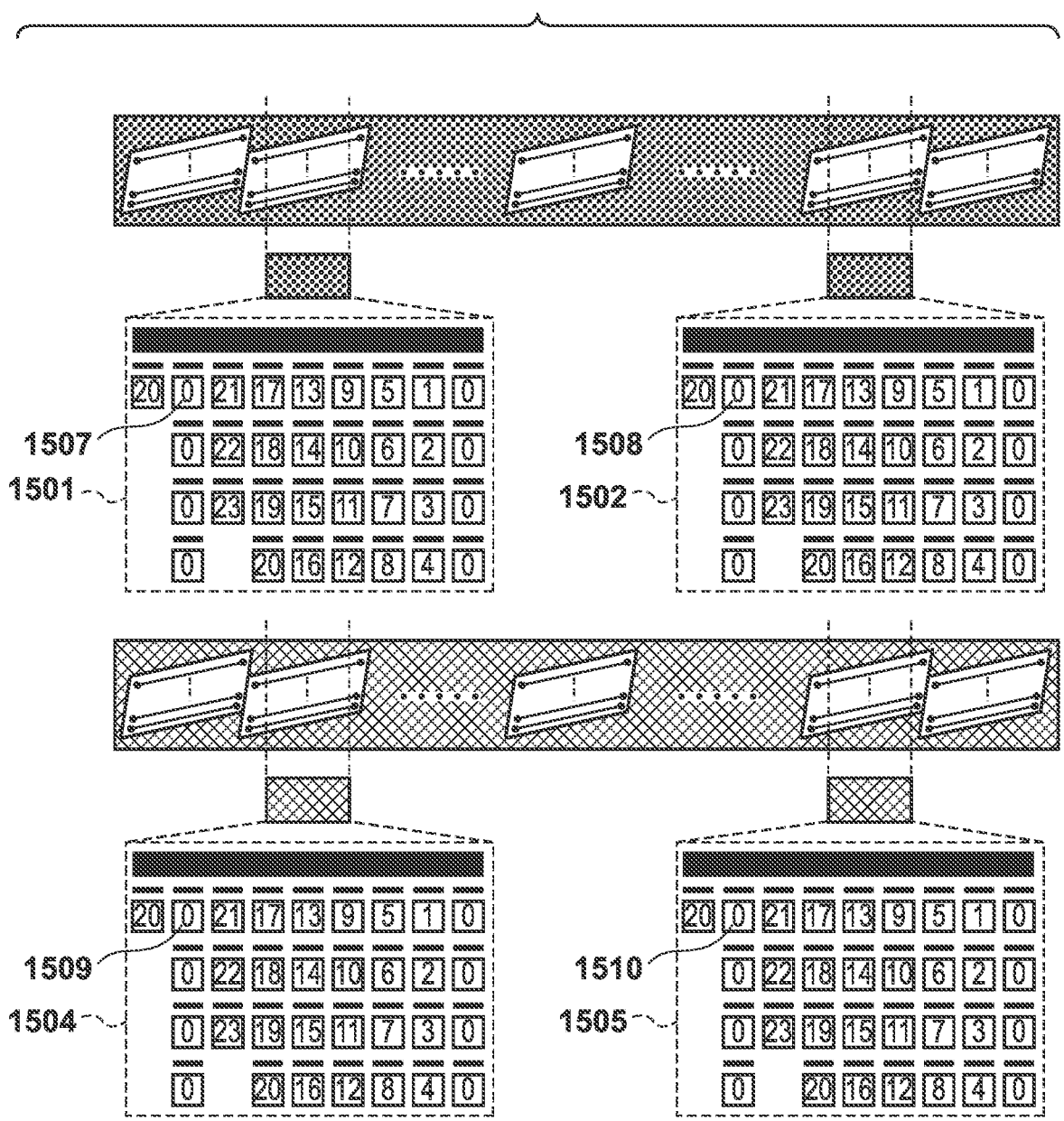
FIGS. 15A and 15B are views for explaining a method of calculating a tilt amount of a printhead and a deviation amount between chips.
Figure 15B:
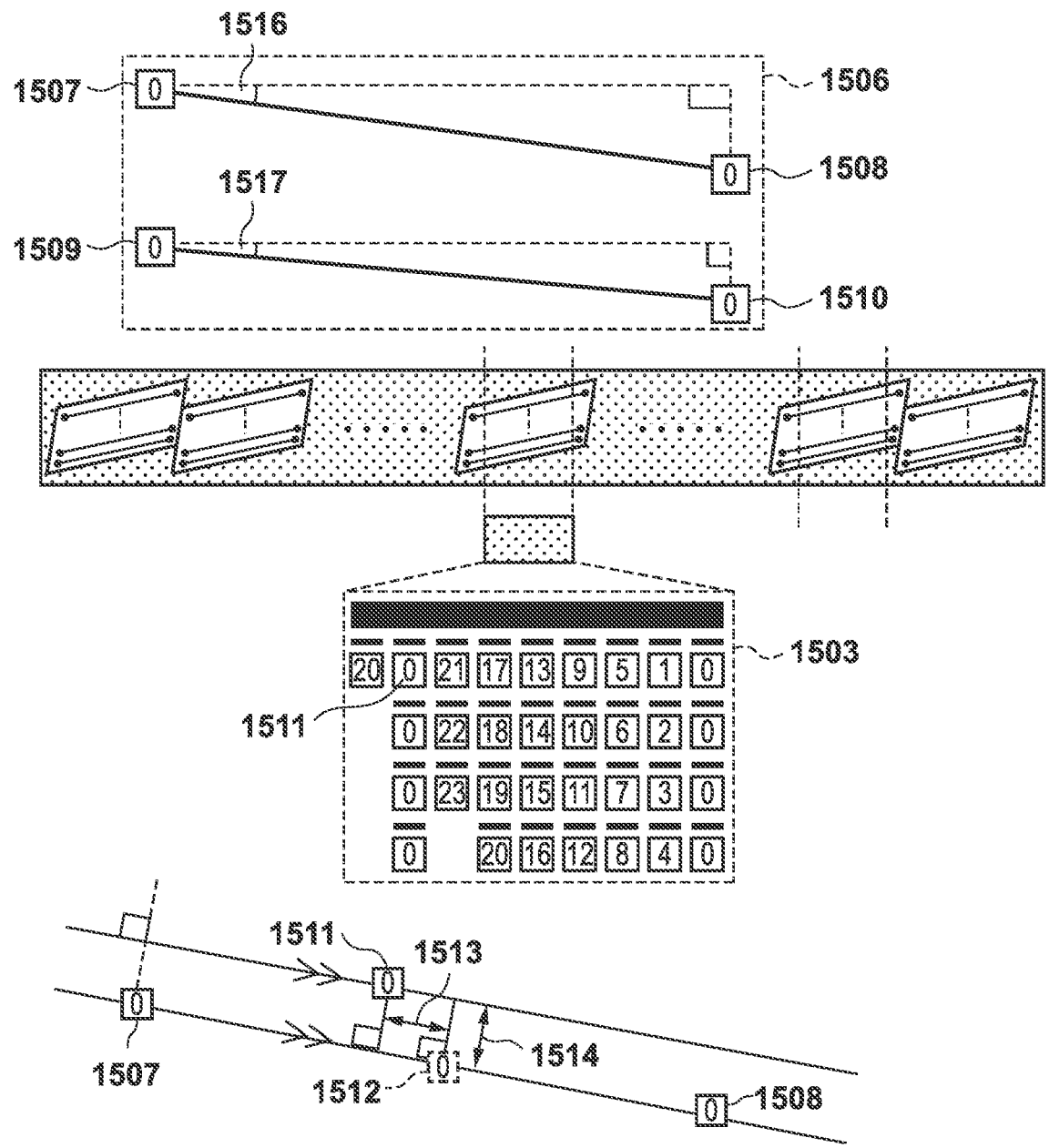

FIGS. 15A and 15B are views for explaining a method of calculating a deviation amount between the print chips 1004 and the tilt amount of the printhead 30. In this embodiment, 36 print chips 1004 are arranged in one printhead 30, and are numbered by setting, as print chip 0, the first print chip from the back side of the apparatus, and setting the last print chip as print chip 35. In FIGS. 15A and 15B, assume that the right side indicates the back side of the apparatus and the left side indicates the front side of the apparatus. A method of calculating an inter-chip deviation amount using a scan image of the pattern printed in accordance with the layout 1201 of the pattern 1016 will be described with reference to FIGS. 15A and 15B.

Print patterns 1501 to 1503 are print patterns printed in accordance with the layout 1201 using three print chips in the printhead 30. Depending on the size or conveyance error of the print medium 1001, there is also a print chip that executes no printing on the print medium 1001. A pattern printed on the print medium 1001 using print chip x will be referred to as a "chip x pattern" hereinafter.

The print pattern 1501 is a pattern printed by the adjacent print chip on the right of the leftmost print chip, among patterns printed on the print medium 1001. In accordance with the size of the print medium 1001 or the like, the number of the print chip used to print the print pattern 1501 changes. This embodiment assumes the print pattern 1501 as a chip 34 pattern. The print pattern 1502 is a pattern printed by the adjacent print chip on the left of the rightmost print chip, among the patterns printed on the print medium 1001. This embodiment assumes the print pattern 1502 as a chip 1 pattern. The print pattern 1503 indicates the layout 1201 of the pattern corresponding to the print chip as an inter-chip deviation amount calculation target. As an example, a description will be provided by targeting print chip 18. Print chip 18 is a print chip located at the center of a print chip array in the printhead 30.

A print pattern 1507 is a pattern printed using nozzle array 0 of print chip 34 in the print pattern 1501. A print pattern 1508 is a pattern printed using nozzle array 0 of print chip 1 in the print pattern 1502. The print chips that print these patterns are reference chips for inter-chip deviation calculation. A print pattern 1511 is a pattern printed using array 0 of print chip 18, and is an inter-chip deviation amount calculation target.

When printing each print pattern by nozzle array 0 of each of print chips 1, 18, and 34, if there is no landing position deviation, a chip 18 pattern is printed by print chip 18 on a straight line connecting the print patterns 1507 and 1508. A print pattern 1512 indicates the position of the chip 18 pattern printed at an ideal position where there is no landing position deviation of discharged ink. On the other hand, the print pattern 1511 indicates the actual printing position of the chip 18 pattern. As a deviation amount between the print patterns 1511 and 1512, a relative position deviation occurs between print chip 18 and the straight line connecting print chips 1 and 34, and the deviation amount of the relative position deviation is indicated by a deviation amount 1514. The deviation amount 1514 is the length of a normal drawn from the print pattern 1511 to the straight line connecting the print patterns 1507 and 1508. Therefore, the deviation amount 1514 can be obtained from the positions of the print patterns 1507, 1508, and 1511. Furthermore, a deviation amount 1513 can be obtained by obtaining the distance between a line passing through the print pattern 1511 and a line passing through the print pattern 1512, both of which are perpendicular to the line connecting the print patterns 1507 and 1508. Therefore, a deviation amount with respect to the direction perpendicular to the straight line connecting the print patterns 1507 and 1508 can be used for printing position correction.

By applying the above-described method, when two print chips in the left and right end portions are used as reference chips, it is possible to obtain a deviation amount from another print chip between the reference chips with respect to a straight line connecting the reference chips. However, a different calculation method is used for print chips provided on the further left and right end sides with respect to the two reference chips (in the example, print chips 34 and 1).

In the example, since two print chips used as reference lines are print chip 34 on the left end side and print chip 1 on right end side, print chip 35 at the left end corresponds to the print pattern 1511 as an adjustment target and print chip 0 at the right end corresponds to the print pattern 1511 as an adjustment target. Similar to other print chips, the print chip at the left end calculates a deviation amount using the pattern 1204 for pattern matching of the layout 1201. On the other hand, the print chip at the right end uses not the pattern 1204 for pattern matching but the pattern 1202 for pattern matching formed by the adjacent print chip on the left. This is because the print chip at the end may be able to print the layout 1201 only up to halfway through the length on the print medium 1001.

Depending on the length of the print medium 1001, there may be print chips outside the print chips at the left and right ends within a printing range. Since these print chips cannot execute printing on the print medium 1001, it is impossible to detect the pattern. Therefore, the print chip outside the print chip on the left end side uses, as a correction value, a deviation mount of the adjacent print chip on the right. Similarly, the print chip outside the print chip on the right end side uses, as a correction value, a deviation amount of the adjacent print chip on the left.

A method of calculating the tilt amount of the printhead 30 using the scan image of the pattern printed in accordance with the layout 1201 will be described with reference to FIGS. 15A and 15B. The tilt amount of the printhead 30 is calculated using the same pattern as that for calculating a deviation amount between the print chips 1004. Furthermore, as for the tilt of the printhead 30, a relative tilt amount from the reference printhead is set as a deviation amount, and a tilt correction amount is calculated for each of the printheads except for the reference printhead.

1506 is a view for explaining a method of calculating the tilt amount of the printhead 30. First, the tilt amount of the reference printhead is calculated. The print patterns 1507 and 1508 are print patterns formed by the above-described reference chips on the left and right end sides. An angle 1516 is an angle formed by the straight line connecting the print patterns 1507 and 1508 and an ideal line obtained when there is no landing position deviation caused by the tilt of the printhead 30, and indicates the tilt amount of the reference printhead.

Next, the tilt amount of the correction target printhead is calculated. In the correction target printhead, the print patterns 1509 and 1510 are print patterns formed by the above-described reference chips on the left and right end sides. An angle 1517 is an angle formed by a straight line connecting the print patterns 1509 and 1510 and an ideal line obtained when there is no landing position deviation caused by the tilt of the printhead 30, and indicates the tilt amount of the correction target printhead.

Finally, a calculation amount of tilt correction of the correction target printhead is calculated. The tilt amount of the correction target printhead can be calculated by the following equation. Assume that the tilt amount of the printhead is represented by an angle.

tilt amount of correction target printhead=angle 1517−angle 1516

This embodiment assumes that among the printheads 30, the printhead 30 for printing K is set as a reference printhead. By applying the above-described method, it is possible to obtain the tilt amount of each of the printheads except for the reference printhead (printhead of K) with respect to the reference printhead.

(Calculation of Deviation Amount Between Printheads)

Figure 16:
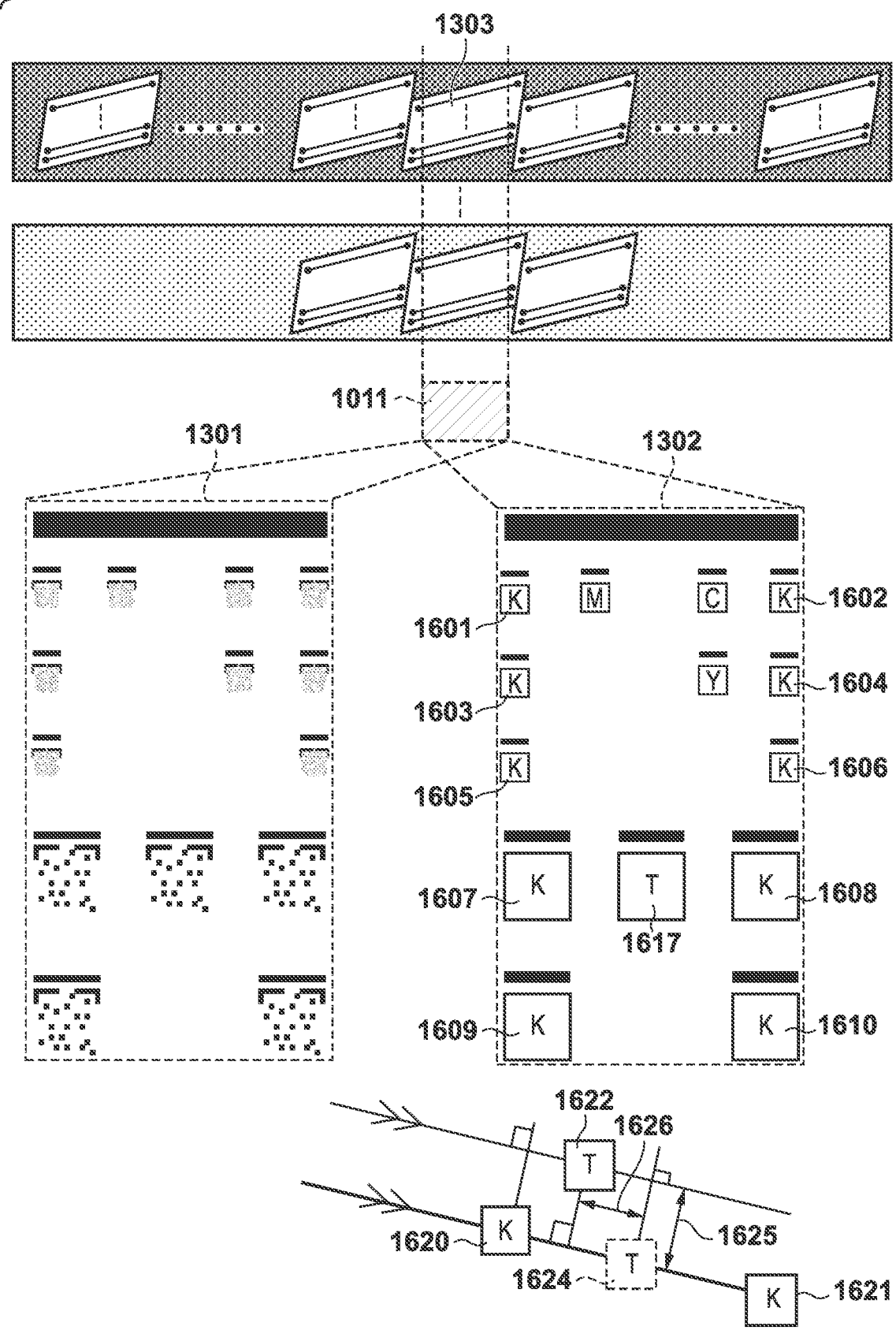
FIG. 16 is a view for explaining a method of calculating a deviation amount and a tilt amount of the printhead according to the first embodiment.

FIG. 16 is a view for explaining a method of calculating a deviation amount between the printheads. In this embodiment, the first printhead from the downstream side in the conveyance direction 801 will be referred to as printhead K using ink color K hereinafter, and the subsequent printheads will be referred to as printhead C, printhead M, and printhead Y, respectively, hereinafter. The printhead that executes printing using clear ink will be referred to as printhead T hereinafter. A method of calculating a deviation amount (to be referred to as an "inter-color deviation" hereinafter) between the printheads using a scan image of a pattern printed in accordance with the layout 1302 for the test pattern 1301 will now be described.

The test pattern 1301 is a test pattern used to calculate an inter-color deviation amount. The test pattern 1301 is printed using the print chip 1303 at the predetermined position in each printhead 30 corresponding to a predetermined color indicated in the layout 1302. In this embodiment, chip 18 is used as the print chip 1303 located at the predetermined position. Print patterns 1601 to 1610 are printed by the reference printhead, and are patterns printed by printhead K in this embodiment. Patterns of other printing colors are calculation targets of the position deviations between the printheads. In this embodiment, these patterns are patterns printed by C ink, M ink, Y ink, and T (clear) ink. However, the number of printing colors may increase/decrease. In this embodiment, an area where a pattern by another printhead is printed is ensured. In this embodiment, printheads C, M, and Y execute printing using the arrangement of the pattern 1022 for pattern matching shown in FIG. 11. Furthermore, the K print patterns 1601 to 1606 of the reference patterns corresponding to those patterns are also printed using the arrangement of the pattern 1022 for pattern matching.

In this embodiment, a print pattern 1617 by clear ink is printed using the arrangement of the pattern 1023 for pattern matching shown in FIG. 11. Therefore, the print patterns 1607 to 1610 as K patterns of the reference patterns corresponding to that pattern are also printed using the arrangement of the pattern 1023 for pattern matching. The reference printhead and the inter-color deviation calculation target printheads use the same type of pattern for pattern matching.

In this embodiment, when calculating the deviation amount between printhead K (reference printhead) and another printhead, calculation is performed for each printhead using the same method. As an example, a method of calculating a deviation amount between printhead K and printhead T (clear ink) will be described. A print pattern 1620 corresponds to the print pattern 1607, and a print pattern 1621 corresponds to the print pattern 1608. These patterns are patterns of the reference printhead printed by chip 18 of printhead K. A print pattern 1622 corresponds to the print pattern 1617, and is a print pattern printed by chip 18 of printhead T, and a print pattern printed by the printhead as a deviation amount calculation target.

When printing the respective print patterns by printhead K and printhead T, if there is no landing position deviation of discharged ink, the print patterns are arranged so that the print pattern of printhead T is printed on a straight line connecting the print patterns 1620 and 1621. A print pattern 1624 indicates the position of the print pattern of printhead T printed at an ideal position where there is no landing position deviation of discharged ink. On the other hand, the print pattern 1622 indicates the actual printing position of the array 18 pattern.

In this embodiment, as a deviation between the print pattern 1622 on the scan image and the print pattern 1624, a relative position deviation occurs in printhead T with respect to printhead K, and the deviation amount of the relative position deviation is indicated by a deviation amount 1625. The deviation amount 1625 is the length of a normal drawn to the print pattern 1622 to be perpendicular to the straight line connecting the print patterns 1620 and 1621. Therefore, the deviation amount 1625 can be obtained based on the positions of the print patterns 1620, 1621, and 1622. In addition, the distance between a line passing through the print pattern 1622 and a line passing through the print pattern 1624, both of which are perpendicular to the straight line connecting the print patterns 1620 and 1621, is obtained. This can obtain a deviation amount 1626 between the print patterns 1624 and 1622. In this embodiment, in calculation of printhead position deviation correction, a correction amount is also calculated with respect to the direction perpendicular to the printhead position deviation amount 1625. Therefore, as for the printhead position deviation amount, a correction amount is calculated with respect to both the directions for the deviation amounts 1625 and 1626.

By applying the above-described method, the inter-color deviation amounts of the printheads except for printhead K can be obtained with respect to the reference printhead.

(Mark Detection Processing)

Figure 17:
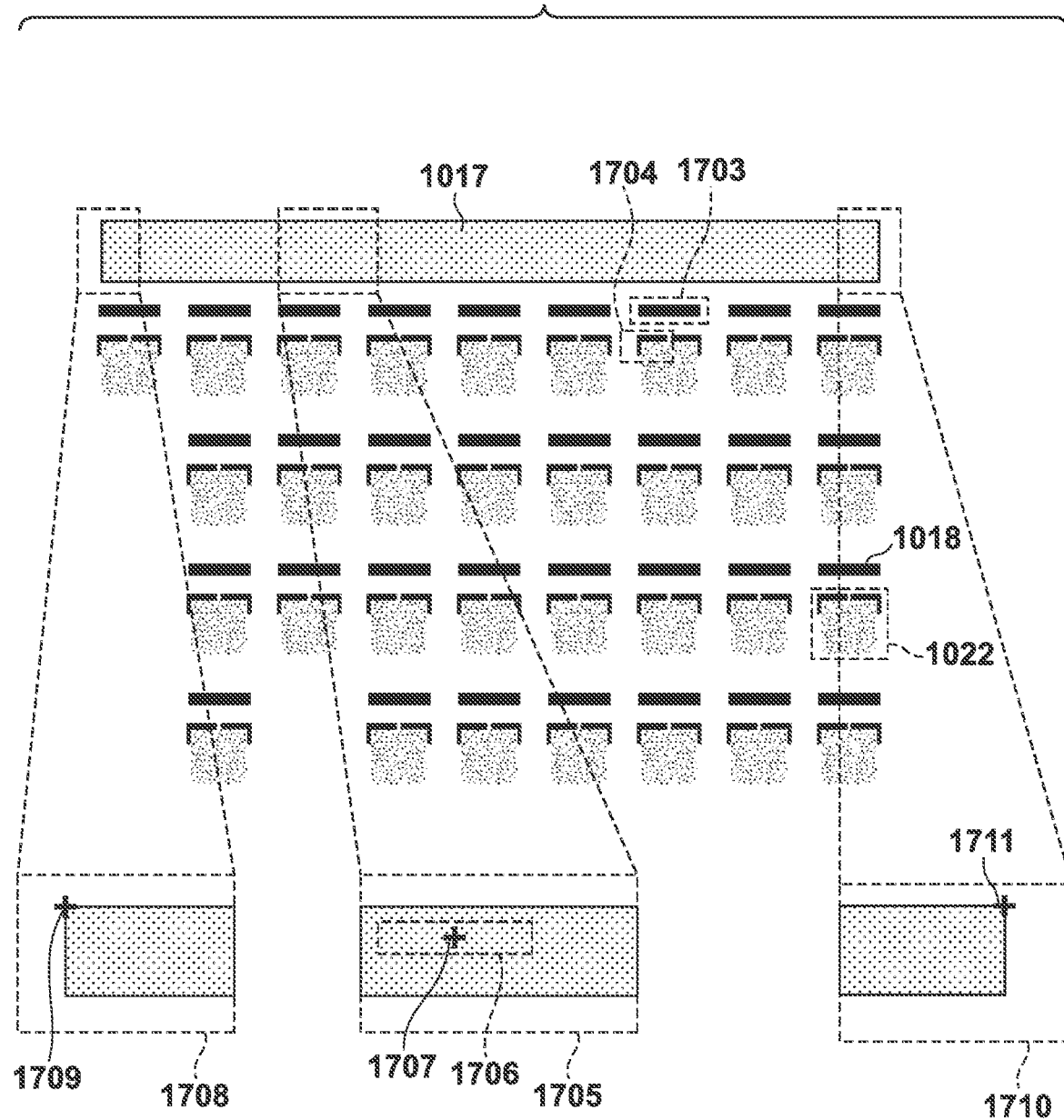
FIG. 17 is a view for explaining detection of a detection mark of a pattern corresponding to a print chip.

FIG. 17 is a view for explaining mark detection processing corresponding to the print chip 1004. In this embodiment, processing of detecting the detection mark of each pattern corresponding to the print chip 1004 from the read image of the test pattern for deviation amount calculation will be described. FIG. 17 shows a pattern corresponding to each print chip, as indicated by the pattern 1016 shown in FIG. 12. In this embodiment, as a pattern corresponding to the print chip 1004, there are three kinds of patterns 1016, 1019, and 1209 shown in FIG. 12. However, the detection processing is performed by the same method. Furthermore, the same detection processing is performed for the test pattern 1301 shown in FIG. 13 for calculating a position error between the printheads 30. A description will be provided using, as an example, the pattern 1016 shown in FIG. 12.

The mark detection processing roughly includes three steps. In the first step, the detection mark 1017 is detected. The position of a test pattern for one print chip 1004 is estimated based on the detected position of the detection mark 1017. In the second step, an alignment mark 1703 is detected based on the estimated position of the test pattern in the first step. Since the pattern 1016 shown in FIG. 12 is exemplified, the alignment mark 1703 is the same as the alignment mark 1018. Since the alignment mark 1703 is printed near each pattern for pattern matching, the position of the corresponding pattern for pattern matching is estimated based on the detected position of the alignment mark 1703. In the third step, pattern position detection is performed using pattern matching based on the estimated position of the pattern for pattern matching in the second step. Since the pattern 1016 shown in FIG. 12 is exemplified, an area 1704 corresponds to the pattern 1022 for pattern matching.

The processing of detecting the detection mark 1017 in the first step will be described. This processing uses the luminance value of a channel in which the density is highest in the printing color of the printhead of the detection target pattern, among three R, G, and B channels of the read image that can be read by the inspection unit 9B. For example, the R channel is used when the color with the highest density is C (cyan), the G channel is used when the color with the highest density is M (magenta), and the B channel is used when the color with the highest density is Y (yellow). Note that one of the channels is designated and used for a printing color, such as K (black), whose density is high in all the channels.

1705 is a view obtained by partially enlarging the detection mark 1017. The detection mark 1017 is detected based on the average density of a predetermined area of the read image. A detection mark detection area 1706 is an area where the average density is obtained. If the average density obtained in the detection mark detection area 1706 is equal to or higher than a predetermined density, the area is specified as a detection mark area, and the central position of the area is set as a detection mark detection position 1707. The predetermined density used as a threshold or a range of the detection mark detection area may be changed.

Subsequently, the upper left end position and the upper right end position of the detection mark 1017 are detected. 1708 is a view obtained by enlarging the peripheral portion of the upper left end of the detection mark 1017, and 1710 is a view obtained by enlarging the peripheral portion of the upper right end of the detection mark 1017. An area where the density is equal to or higher than the predetermined density is scanned from the detection mark detection position 1707, and the upper left end portion of the area where the density is equal to or higher than the predetermined density is set as an upper left end position 1709 of the detection mark. Similarly, the upper right end portion of the area where the density is equal to or higher than the predetermined density is set as an upper right end position 1711 of the detection mark. An alignment mark detection range is estimated by calculating the center of gravity of the density of a predetermined area from the position decided based on the upper left end position 1709 of the detection mark. It is possible to estimate a detection range of the alignment mark 1703 by detecting the detection mark 1017 of the pattern 1016 shown in FIG. 10. Similar to the detection processing of the detection mark 1017, the detection processing of the alignment mark 1703 detects the position of the alignment mark 1703 by scanning an area where the density is equal to or higher than the predetermined density, and calculating the center of gravity of the density of the area.

Subsequently, the position of the pattern for pattern matching is estimated. The area 1704 is an area indicating the upper left end position of the pattern for pattern matching. Furthermore, the detection result of the detection mark 1017 is used to judge a specific chip of a specific printhead corresponding to the pattern. The final position of the pattern for pattern matching on the image is detected by roughly deciding the position by the above processing and then performing position detection processing including pattern matching processing. The position of the pattern for pattern matching on the image is a position at which a distance used to calculate various deviation amounts in printhead position deviation correction is calculated. The various deviation amounts include a manufacturing error between the nozzle arrays, a manufacturing error between the chips, the tilt of the printhead, and a position deviation between the printheads.

[Processing Procedure]

Figure 18:
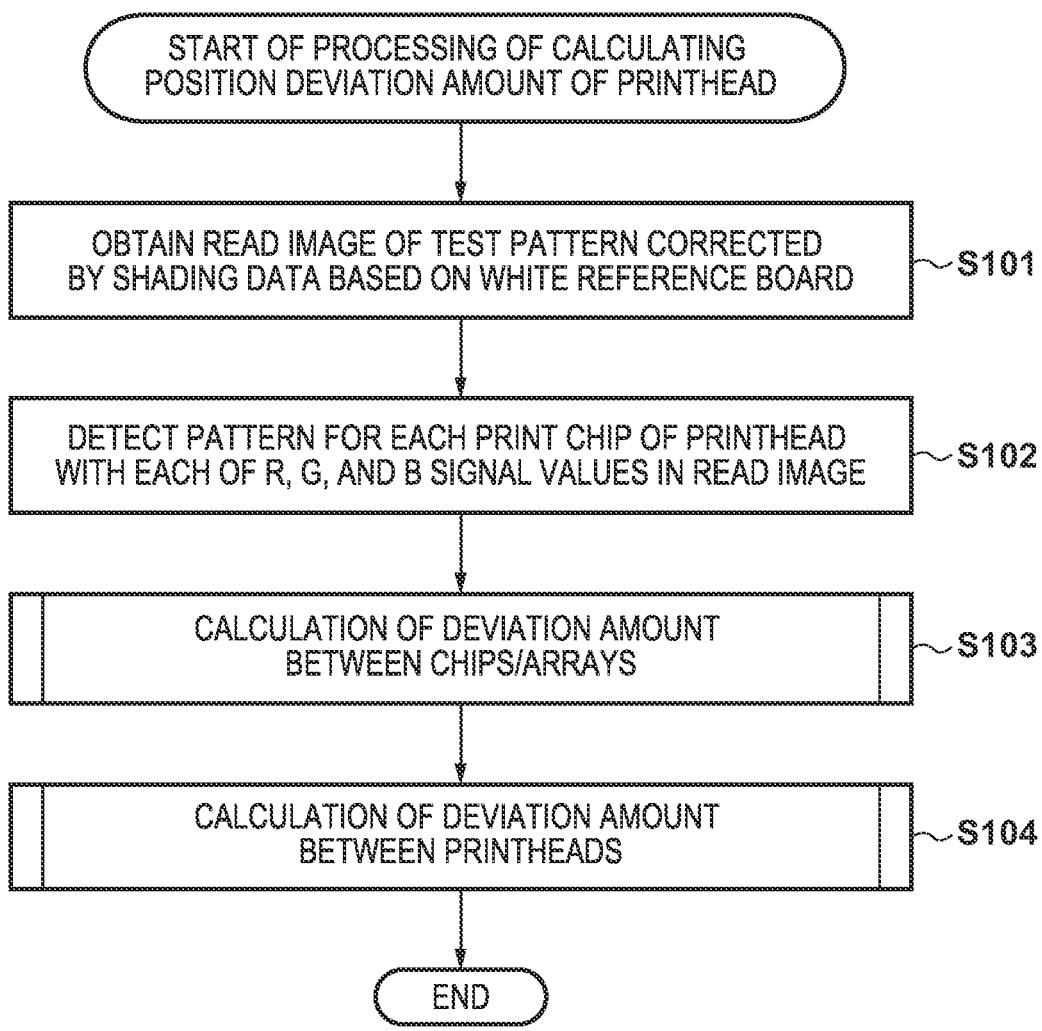
FIG. 18 is a flowchart illustrating deviation amount calculation processing according to the first embodiment.
Figure 19:
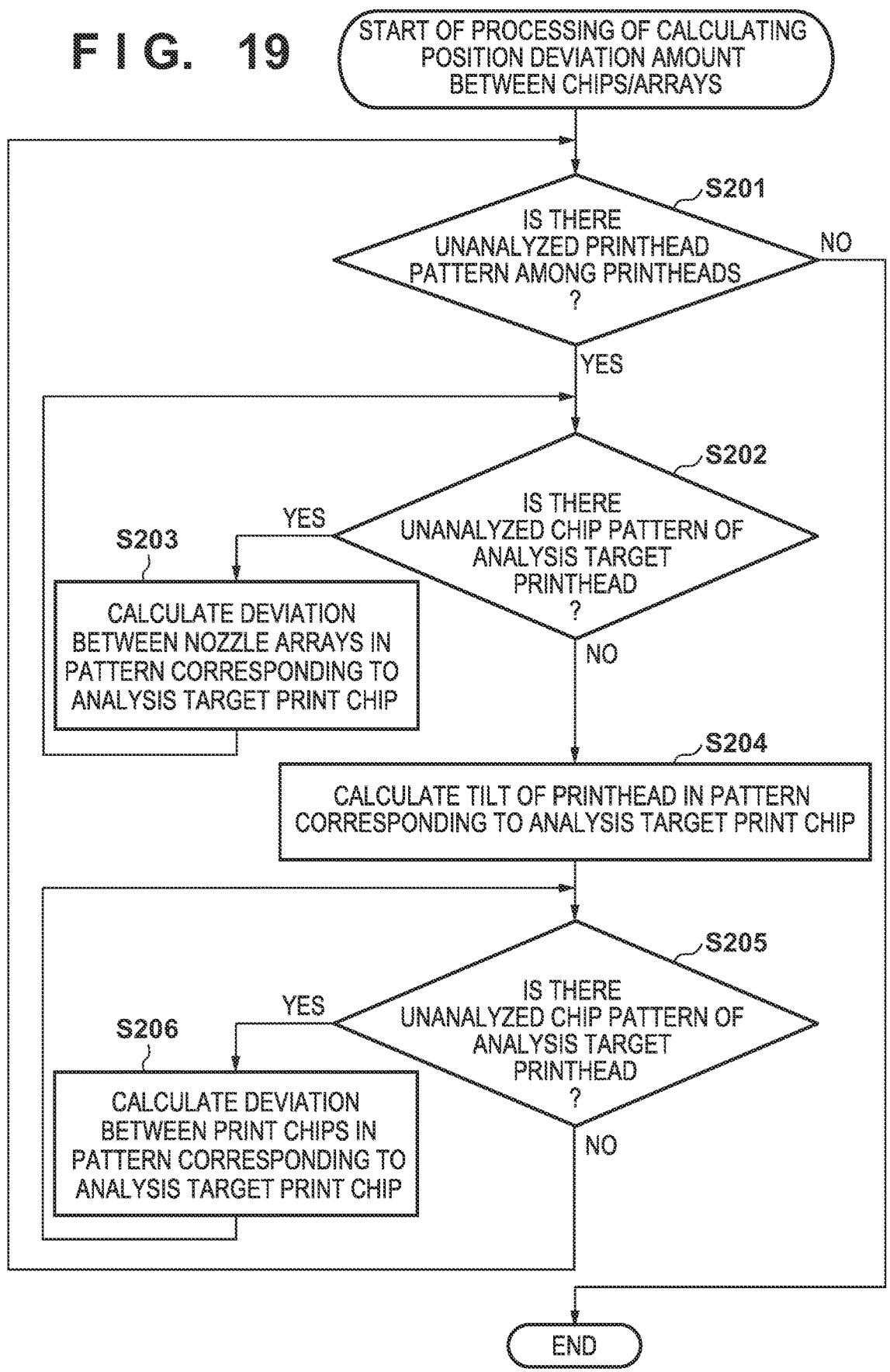
FIG. 19 is a flowchart illustrating the deviation amount calculation processing according to the first embodiment.
Figure 20:
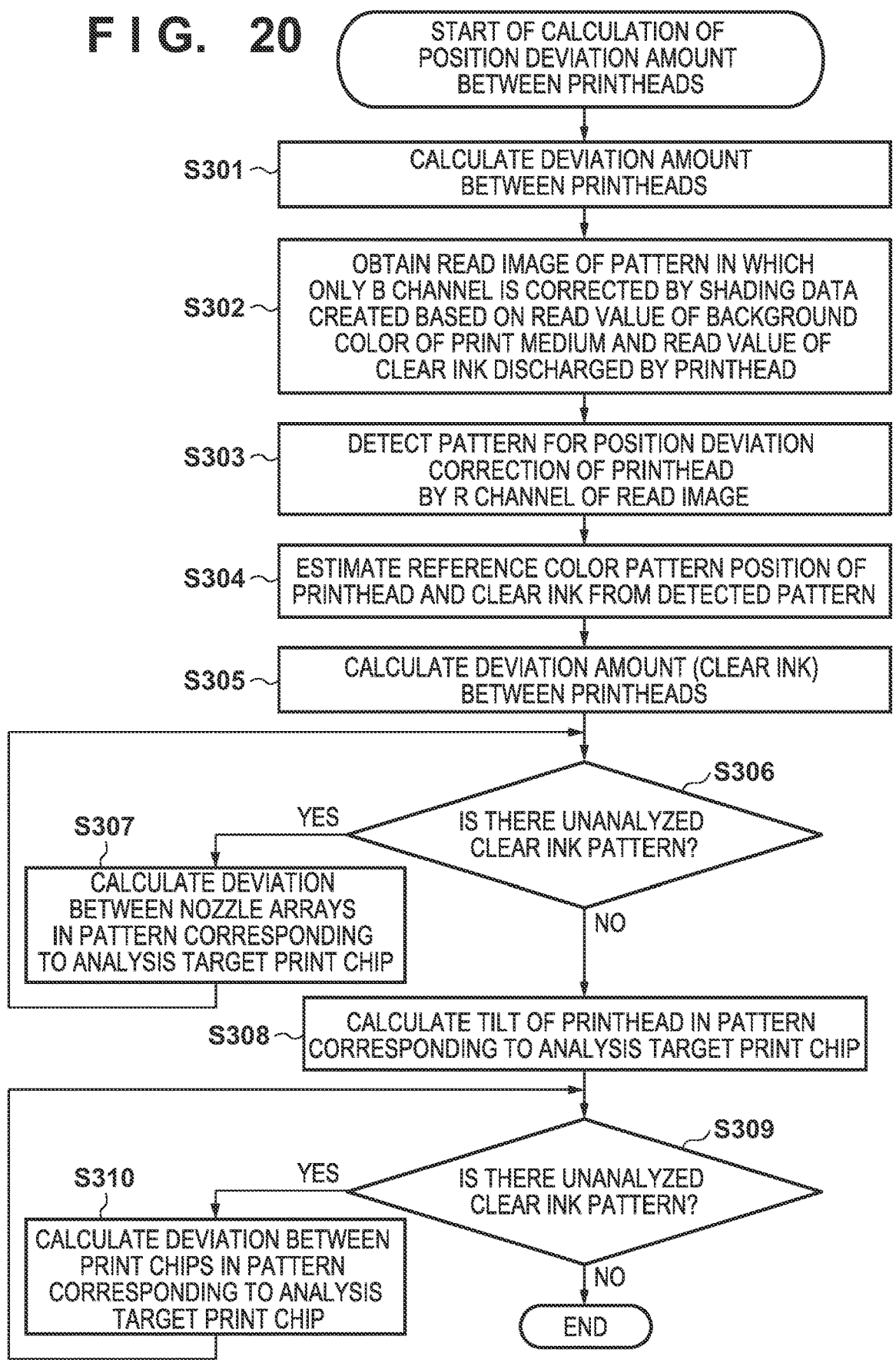
FIG. 20 is a flowchart illustrating the deviation amount calculation processing according to the first embodiment.

FIGS. 18 to 20 are flowcharts for explaining the procedure of reading and analyzing each pattern according to this embodiment. That is, FIGS. 18 to 20 are flowcharts illustrating position deviation amount calculation and analysis processing for performing correction using the test pattern 1002 for printhead position deviation correction printed on the print medium 1001. FIG. 18 shows the overall printhead position deviation amount calculation processing. FIG. 19 shows detailed processing in step S103 of FIG. 18. FIG. 20 shows detailed processing in step S104 of FIG. 18. In these processing procedures, the respective control units of the engine controller 13B perform processes in cooperation with each other. When this processing starts, the test pattern 1002 has already been printed on the print medium 1001.

In step S101, the inspection unit 9B reads the test pattern 1002 for printhead position deviation correction printed on the print medium 1001. At this time, the inspection unit 9B corrects the read test pattern 1002 using shading data created by reading a white reference board (not shown) serving as a white reference, and obtains the corrected pattern as a read image. In this correction processing, data of the read image is corrected so that the value of the shading data created by reading the white reference becomes the highest luminance value. Assume that the shading data created using the white reference board is created in advance. The shading data may be created at a predetermined time interval or created immediately before the processing procedure. The inspection unit 9B may start reading the test pattern 1002 after waiting for a predetermined time since the start of printing of the test pattern 1002. Alternatively, the inspection unit 9B may start reading the test pattern 1002 after conveying the print medium 1001 by a predetermined amount since the end of printing of the test pattern 1002. Reading ends when a predetermined number of sub-scanning lines are read after the start of reading.

In step S102, the inspection control unit 15E detects the pattern corresponding to each print chip 1004 from the read image of the test pattern 1002 read in step S101. The processing of detecting the pattern corresponding to each print chip 1004 is performed by the method described with reference to FIG. 17. The detection mark 1017 corresponding to each print chip 1004 of each printhead 30 is detected with each of R, G, and B signal values in the read image, and the pattern 1022 or 1023 for pattern matching is finally detected.

In this embodiment, the printing colors of the printheads 30 that can be detected here are K, M, C, and Y among K, M, C, Y, and clear ink. The number of detected printing colors changes in accordance with the statuses of the printheads 30 that print on the print medium 1001. Furthermore, this embodiment assumes that the printing color as an ink color such that "a difference in luminance value between the ink color and the background color of the print medium 1001 is small" is clear ink. Note that ink whose difference in luminance value between the background color and the ink color is smaller than a predetermined threshold may be used as the above ink color. Furthermore, the pattern corresponding to each print chip 1004 is classified as the pattern 1016, 1019, or 1209 corresponding to each print chip 1004 of each printhead 30 or the test pattern 1301 for the position deviation of each printhead 30.

In step S103, the inspection control unit 15E calculates a deviation amount between the nozzle arrays of each print chip 1004 using the pattern corresponding to each print chip 1004 of each printhead 30 detected in step S102. Furthermore, the inspection control unit 15E calculates the inter-chip deviation amount of each print chip 1004. Step S103 will be described in detail with reference to FIG. 19.

In step S104, the inspection control unit 15E calculates the position deviation amount of each printhead 30 using the test pattern 1301 for the position deviation of each printhead 30 detected in step S102. Furthermore, the inspection control unit 15E performs the second test pattern reading processing, and calculation of the printhead position deviation amount of the printhead 30. In the second test pattern reading processing, the same test pattern as in step S101 is corrected using different shading data, and is obtained as a read image. After that, the inspection control unit 15E performs correction amount calculation processing. The different shading data in this step is shading data for performing correction so that a difference in luminance value between the clear ink and the ground color of the print medium 1001 becomes more conspicuous. Therefore, a read image of signal values different from the R, G, B signal values in step S102 is obtained. The inspection control unit 15E detects the test pattern of the read image, and calculates a position deviation amount. Step S104 will be described in detail with reference to FIG. 20. Then, the processing procedure ends.

(Calculation of Position Deviation Amount Between Chips/Nozzle Arrays)

FIG. 19 is a flowchart illustrating the processing of calculating position deviation amounts between the print chips and between the nozzle arrays in step S103 of FIG. 18.

In step S201, for each printhead 30 for which the pattern has been detected in step S102, the inspection control unit 15E determines whether there is an unanalyzed pattern. If all the printheads 30 have been analyzed (NO in step S201), the processing procedure ends; otherwise (YES in step S201), the process advances to step S202.

In step S202, for each of the print chips 1004 of the analysis target printhead 30, the inspection control unit 15E determines whether there is a pattern corresponding to the print chip for which the deviation amount between the nozzle arrays has not been analyzed. If the deviation amount between the nozzle arrays has been analyzed for all the print chips 1004 (NO in step S202), the process advances to step S204; otherwise (YES in step S202), the process advances to step S203.

In step S203, the inspection control unit 15E selects the pattern corresponding to the analysis target print chip 1004, and analyzes the deviation amount between the nozzle arrays of the print chip. If the pattern is the pattern 1016, the calculation processing described with reference to FIG. 14 is performed. If the pattern is the pattern 1019 or 1209, the analysis processing is skipped. After that, the process returns to step S202.

In step S204, the inspection control unit 15E selects the pattern corresponding to the analysis target printhead 30, and analyzes the tilt amount of the printhead 30. As an analysis method here, the method described with reference to FIGS. 15A and 15B is used.

In step S205, for each of the print chips 1004 of the analysis target printhead 30, the inspection control unit 15E determines whether there is a pattern corresponding to a print chip for which an inter-chip deviation amount has not been analyzed. If an inter-chip deviation amount has been analyzed for all the print chips 1004 (NO in step S205), the process returns to step S201; otherwise (YES in step S205), the process advances to step S206.

In step S206, the inspection control unit 15E selects the pattern corresponding to the analysis target print chip 1004, and analyzes the inter-chip deviation amount of the print chip. If the pattern is the pattern 1016, the calculation processing described with reference to FIGS. 15A and 15B is performed. If the pattern is the pattern 1019 or 1209, the analysis processing is skipped. After that, the process returns to step S205.

As described above, for each printhead 30 for which the pattern is detected in step S102, calculation of a deviation amount between the nozzle arrays of each print chip 1004, calculation of the inter-chip deviation amount of each print chip 1004, and calculation of the tilt amount of each printhead 30 are performed.

FIG. 20 is a flowchart illustrating step S104 of FIG. 18.

In step S301, the inspection control unit 15E selects the pattern corresponding to calculation of the position deviation amount of each printhead 30, and analyzes the tilt amount of the printhead. As an analysis method here, the method described with reference to FIG. 16 is used. The printing color to undergo analysis is the printing color of each printhead 30 for which the pattern has been detected in step S102. Upon completion of step S301, calculation of a deviation amount between the nozzle arrays of each print chip 1004 and calculation of the inter-chip deviation amount of each print chip 1004 are completed for the printing color of each printhead 30 for which the pattern has been detected in step S102. For the printing color of each printhead 30 for which the pattern has been detected in step S102, calculation of the position deviation amount of each printhead 30 is completed.

In step S302, the inspection unit 9B reads the same pattern as the test pattern 1002 read in step S101. At this time, the inspection unit 9B creates shading data by reading the background color of the print medium 1001 and the ink color (that is, clear ink) such that "a difference in luminance value between the ink color and the background color of the print medium is small". The value of the shading data is a value between data obtained by reading the background color and data obtained by reading clear ink. If the data is a luminance value, "data of background color>data of clear ink" is satisfied. Then, a read image of the test pattern obtained by performing correction using the above shading data by targeting one or more of the R, G, and B channels of the image is obtained. This reading processing assigns, to the read image in step S302, signal values that make it possible to detect the ink color which is difficult to detect with the R, G, and B signal values in the read image in step S101.

The same test pattern 1002 is corrected by the different shading data in steps S101 and S302, respectively. In the correction processing in step S302, data of a value smaller than the value of the shading data is corrected to be the lowest luminance value (0 in this example). Assuming that "data of background color>shading data>clear ink" is satisfied, the value of the read data of clear ink is a value corresponding to the lowest luminance. The color of the image of clear ink is corrected to be close to black. This can detect, in step S101, the correct printing position of the printing color pattern detected with the R, G, and B signal values in the read image. Furthermore, in step S302, it is possible to detect the correct printing position of the printing color pattern of the ink color (in this embodiment, clear ink) such that "a difference in luminance value between the ink color and the background color of the print medium is small" using one or more of the R, G, and B signal values in the read image. This method can be implemented using a general scanner for the inspection apparatus. Therefore, it is unnecessary to use a high-end special apparatus.

In this embodiment, shading data is created by reading clear ink and the background color of the print medium 1001, thereby correcting the B channel of the image. Therefore, the signal values that make it possible to detect clear ink by the B channel are obtained.

In step S303, the inspection control unit 15E detects the pattern for position deviation correction of each printhead 30 by the R channel of the read image. This is the same as for the test pattern 1301 for the position deviation of each printhead 30 detected in step S102. In this embodiment, the R channel is a channel for performing correction using the shading data created by reading the white reference board (not shown), and it is thus possible to detect the pattern.

In step S304, the inspection control unit 15E estimates, using the test pattern 1301 for the position deviation of each printhead 30 detected in step S303, the pattern position of the printhead 30 for which the position deviation amount of the printhead has not been analyzed. The printhead 30 as a position deviation correction target corresponds to the ink color such that "a difference in luminance value between the ink color and the background color of the print medium is small", and corresponds to clear ink in this embodiment. Since the reference printhead for position deviation correction of the printhead 30 is the printhead of K ink in this embodiment, the positions of the patterns printed by the printheads of clear ink and K ink are estimated.

In step S305, the inspection control unit 15E selects the pattern corresponding to calculation of the position deviation amount of the printhead 30 of clear ink, and analyzes the tilt amount of the printhead 30. As an analysis method here, the method described with reference to FIG. 16 is used. The printing color to undergo analysis is the printing color of the printhead detected by the channel corresponding to the printing color in accordance with a result of estimating the pattern position in step S304. In this embodiment, in the position estimation area of clear ink as a position deviation correction target of the printhead, pattern detection is performed by the B channel. In the area of printhead K as the reference printhead, pattern detection is performed by the R channel.

In step S306, for the printhead 30 of clear ink, the inspection control unit 15E determines whether there is an unanalyzed pattern. If analysis has been performed for all the patterns (NO in step S306), the process advances to step S308; otherwise (YES in step S306), the process advances to step S307.

In step S307, the inspection control unit 15E selects the pattern corresponding to the analysis target print chip 1004, and analyzes a deviation amount between the nozzle arrays of the print chip 1004. If the pattern is the pattern 1016, the calculation processing described with reference to FIG. 14 is performed. If the pattern is the pattern 1019 or 1209, the analysis processing is skipped. After that, the process returns to step S306.

In step S308, the inspection control unit 15E selects the pattern corresponding to the unanalyzed printhead 30, and analyzes the tilt amount of the printhead. As an analysis method here, the method described with reference to FIGS. 15A and 15B is used.

In step S309, for each of the print chips 1004 of the unanalyzed printhead 30, the inspection control unit 15E determines whether there is a pattern corresponding to a print chip for which the inter-chip deviation amount has not been analyzed. If the inter-chip deviation amount is analyzed for all the print chips 1004 (NO in step S309), the processing ends; otherwise (YES in step S309), the process advances to step S310.

In step S310, the inspection control unit 15E by selects the pattern corresponding to the unanalyzed print chip 1004, and analyzes the inter-chip deviation amount of the print chip. If the pattern is the pattern 1016, the calculation processing described with reference to FIGS. 15A and 15B is performed. If the pattern is the pattern 1019 or 1209, the analysis processing is skipped. After that, the process returns to step S309.

As described above, for the printhead 30 of clear ink, correction calculation between the nozzle arrays of each print chip 1004, calculation of the inter-chip deviation amount of each print chip 1004, and calculation of the tilt amount of each printhead 30 are performed.

Upon completion of step S310, calculation of the deviation amount between the nozzle arrays of each print chip 1004 and calculation of the inter-chip deviation amount of each print chip 1004 are completed for the printing color of each printhead 30. Furthermore, calculation of the tilt amount of each printhead 30 and calculation of the position deviation amount of each printhead 30 are completed.

As described above, according to this embodiment, even if each of the patterns of some printing colors has a small difference in luminance value between the printing color and the background color of the print medium in a read image of the test pattern, it is possible to detect the correct printing position of each of the patterns. Furthermore, since processing is performed using an existing detection unit, it is unnecessary to use a special light source or the like, thereby suppressing the cost. Then, position control of the printhead and discharge control of ink are possible based on the deviation amount obtained by the above processing.

In the above example, the pattern is detected by image data corrected using the image data corrected using the shading data created by reading the white reference board and the R, G, and B signal values in an image corrected using the shading data created by reading the printing color and the background color of the print medium. This method can detect the correct printing positions of the patterns of each printing color read using the R, G, and B channels of the read image corrected by the white reference board and the printing color with a small difference in luminance value with respect to the background color of the print medium. Therefore, even if each of the patterns of some printing colors has a small difference in luminance value between the printing color and the background color of the print medium in the image obtained by reading the test pattern by the reading unit, it is possible to detect the pattern accurately and improve the accuracy of position deviation correction.

Second Embodiment

This embodiment shows an example of changing a test pattern printed by clear ink to improve the visibility of a pattern printed by clear ink with respect to the arrangement described in the first embodiment. The components except for the test pattern are the same as in the first embodiment and a repetitive description thereof will be omitted.

Figure 21:
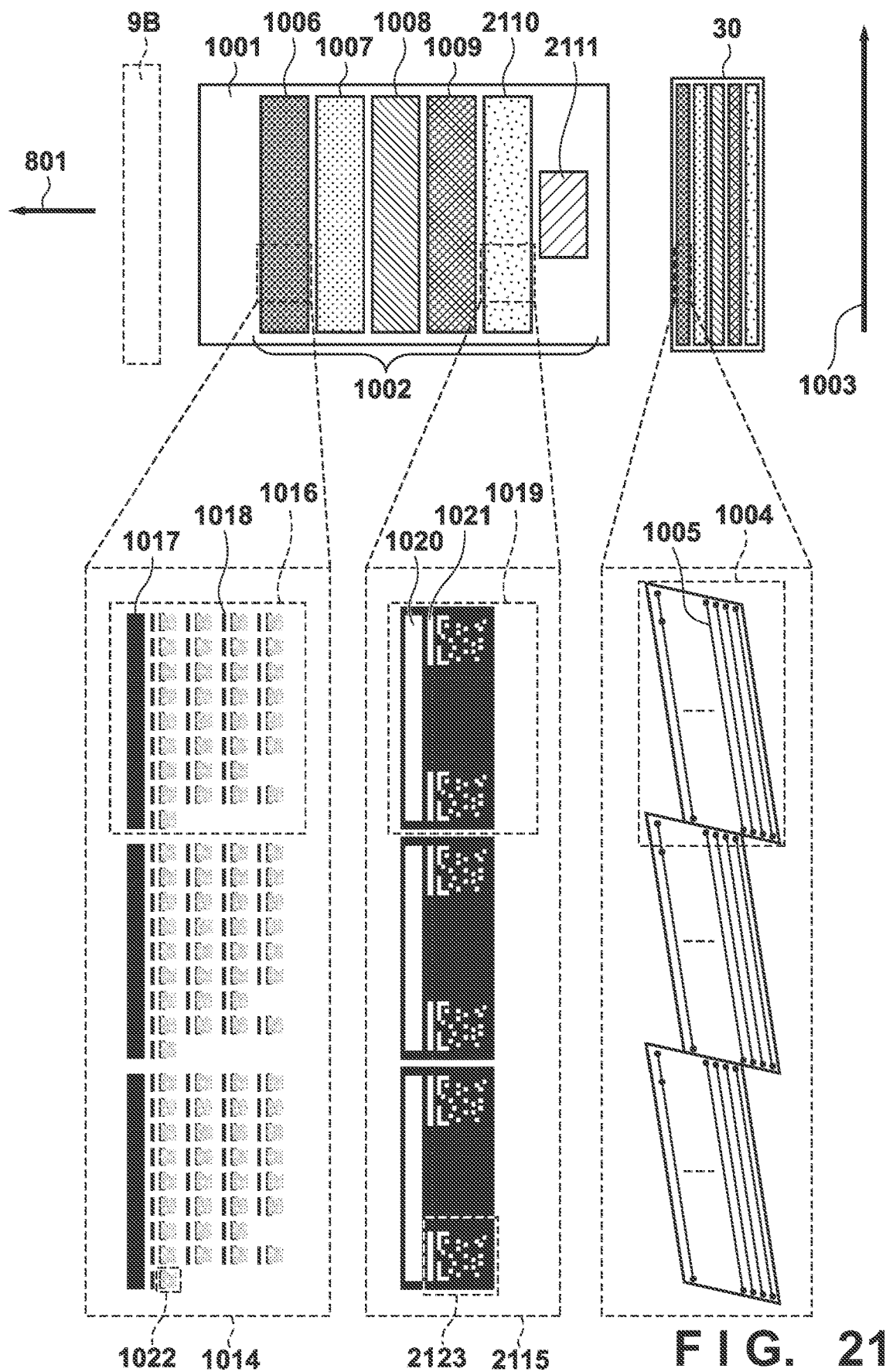
FIG. 21 is a view for explaining a test pattern for printhead position deviation correction according to the second embodiment.

FIG. 21 is a view for explaining a test pattern for position deviation correction of each printhead according to this embodiment. The difference from FIG. 10 described in the first embodiment is that a test pattern 2110 corresponding to a printhead 30 of clear ink and a test pattern 2111 for calculating an inter-color deviation amount between the printheads are changed. A pattern 2119 is a pattern corresponding to one print chip corresponding to clear ink. The pattern 2119 includes a detection mark 2120, alignment marks 2121, and patterns 2123 for pattern matching. As indicated by a pattern 2115, to improve the visibility of clear ink, the detection mark 2120, the alignment marks 2121, and the patterns 2123 for pattern matching are inverted with respect to FIG. 10 in the first embodiment. Inversion increases the print area of the clear ink portion. A black portion is a portion printed using clear ink. A white portion is an unprinted portion, that is, a background portion of a print medium 1001. In the pattern 2123 for pattern matching, the pattern can be recognized by the white unprinted portion and the black portion printed by clear ink.

FIG. 22 shows details of the pattern 2123 for pattern matching. 2203 represents the number of pixels in the vertical direction of the pattern 2123 for pattern matching, and 2204 represents the number of pixels in the horizontal direction. This is the same as the pattern 1023 for pattern matching shown in FIG. 11 in the first embodiment.

Figure 23:
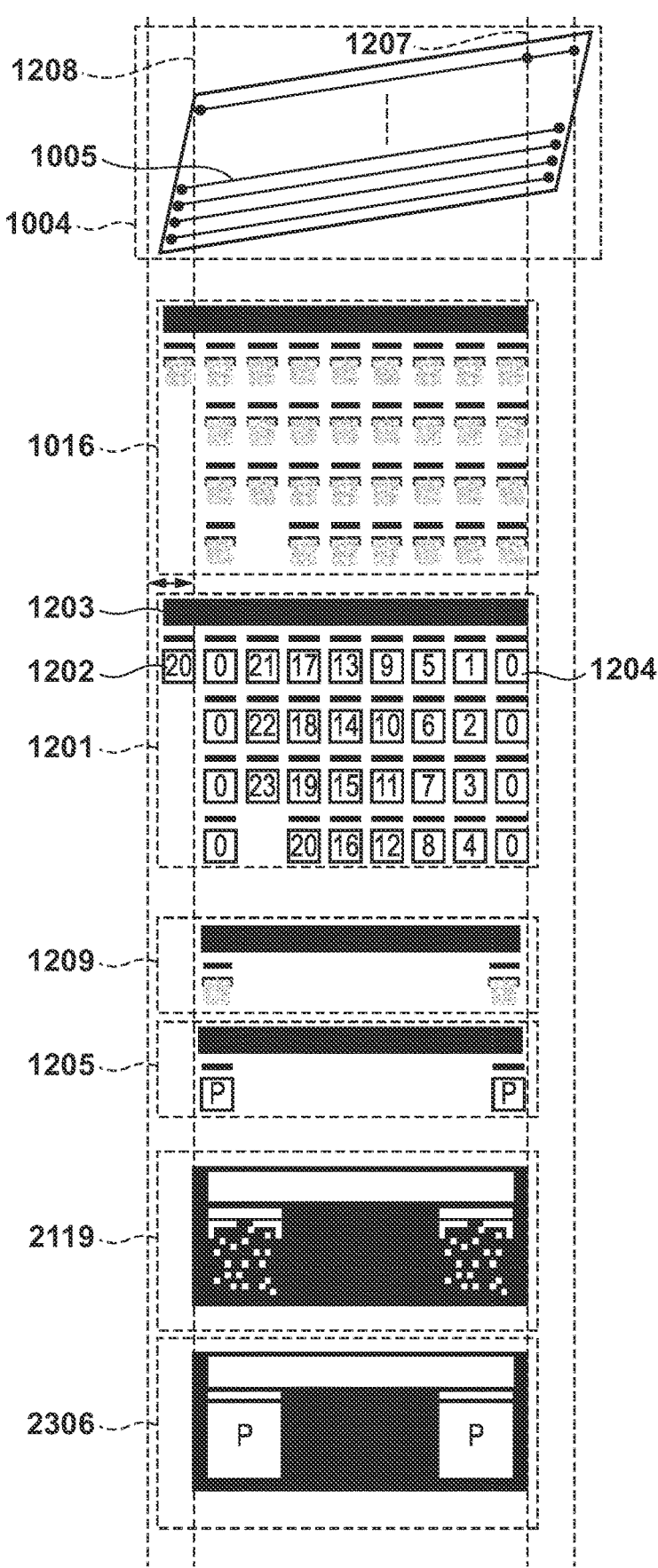
FIG. 23 is a view showing an example of a pattern for pattern matching according to the second embodiment.

FIG. 23 is a view showing the correspondence between the discharge nozzles and a pattern 1016 or the pattern 2119 corresponding to the print chip according to this embodiment. Each of the patterns 2123 for pattern matching of the pattern 2119 corresponding to one print chip corresponds to nozzles for a layout 2306.

Figure 24:
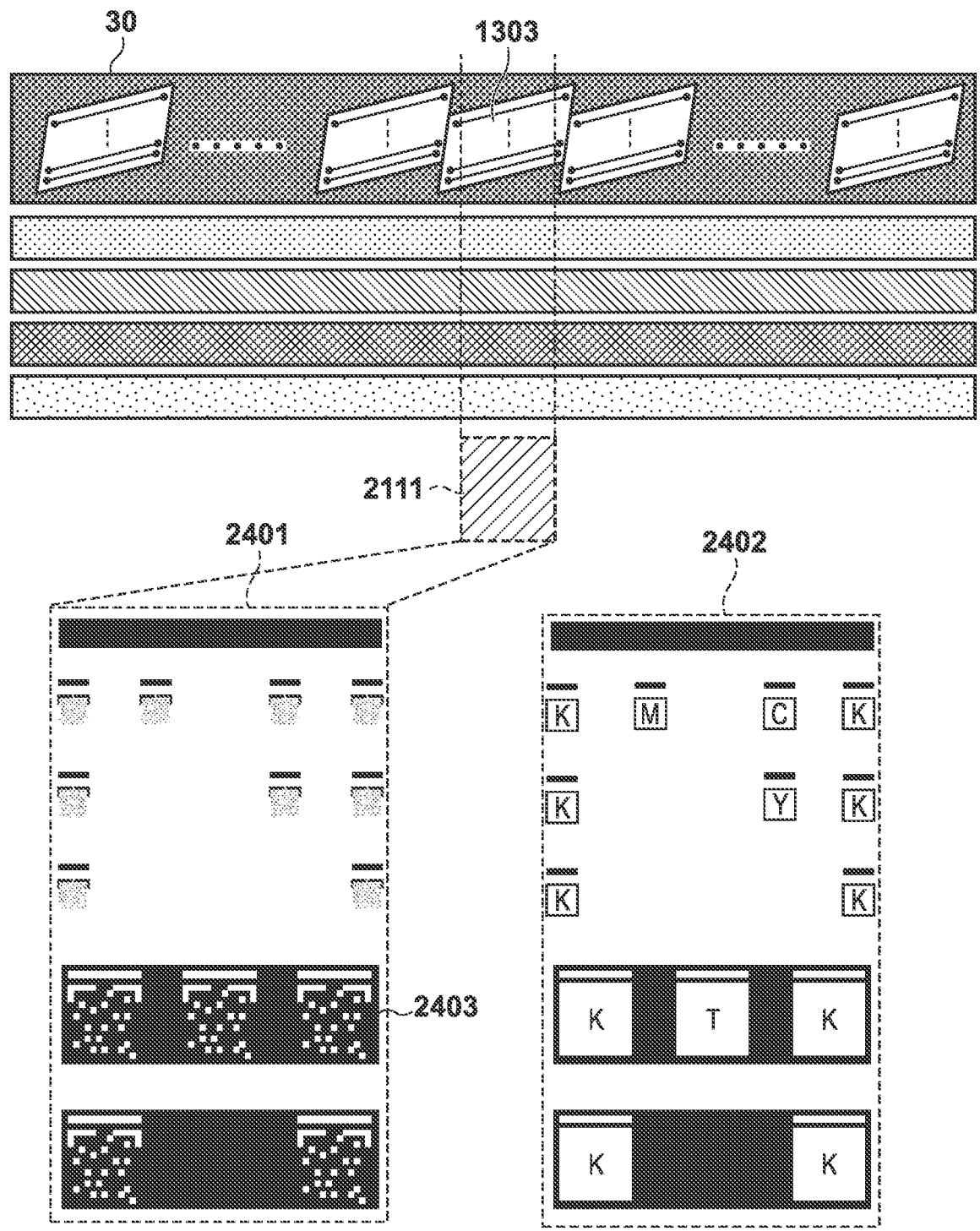
FIG. 24 is a view for explaining a pattern layout according to the second embodiment.

FIG. 24 is a view showing the correspondence among print chips 1004 and a test pattern for performing inter-color deviation correction calculation between the printheads 30 according to this embodiment. In FIGS. 24, K, C, M, and Y are the same as in FIG. 13 described in the first embodiment. A test pattern 2401 is a test pattern for calculating a position error between the printheads 30. This pattern is printed by the printheads of the printing colors, as indicated by a layout 2402. As indicated by the layout 2402, the pattern is printed using printhead K as a reference printhead, and the position deviation of each printhead 30 is calculated. In a pattern 2403 for calculating the position deviation between K ink and clear ink, the pattern 2123 for pattern matching is used. A black portion is a portion of a pattern printed by the corresponding printing color (ink), and a white portion is an unprinted portion (that is, the background of the print medium 1001). In this embodiment, the visibility of the test pattern for clear ink is improved, as compared with the first embodiment, by using the inverted pattern 2123 for pattern matching. Note that as the pattern of the reference printhead, the same pattern as the pattern for pattern matching for the printing color of a deviation amount calculation target is used. The corresponding pattern for pattern matching may be changed in accordance with the color.

Figure 25:
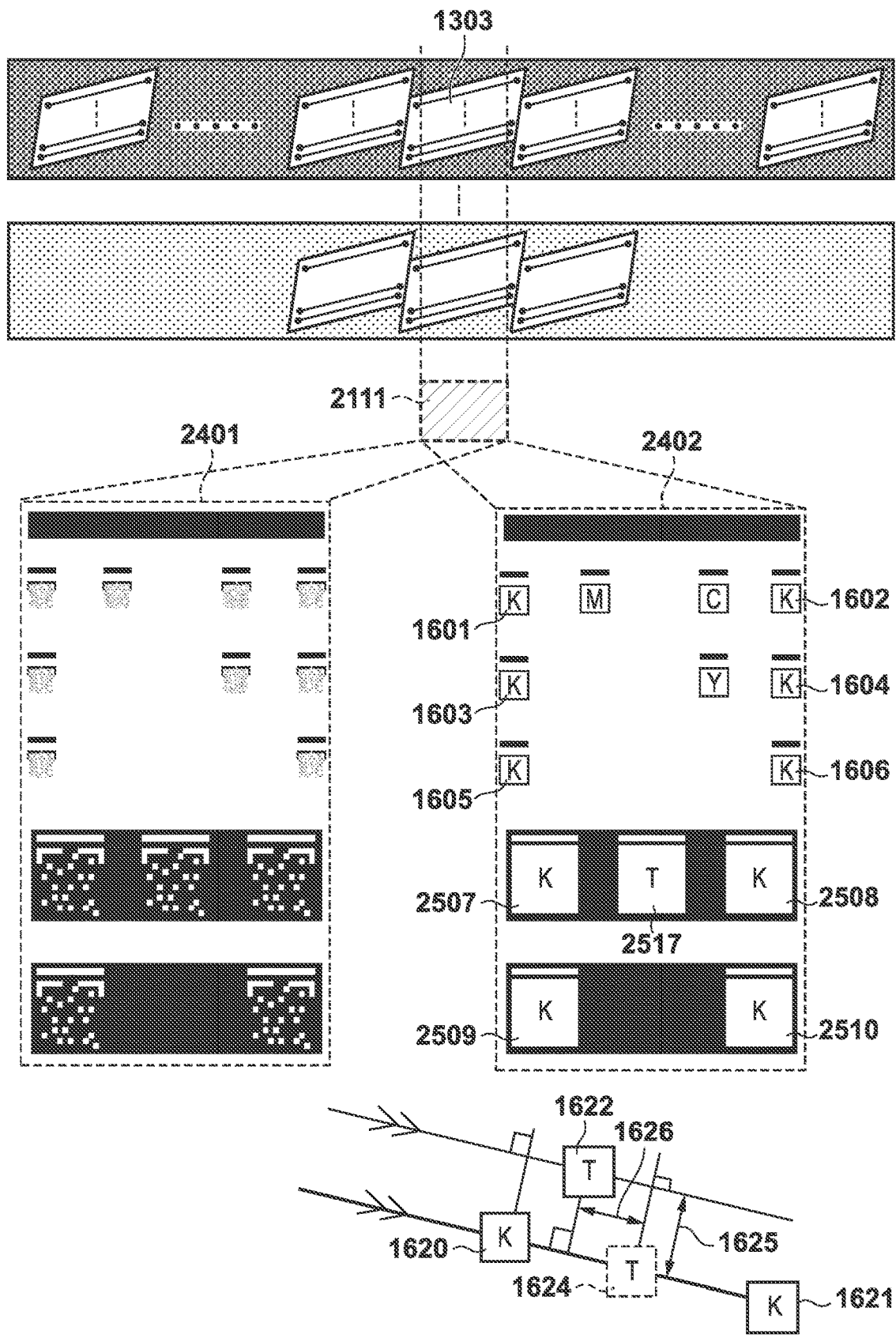
FIG. 25 is a view for explaining a method of calculating a tilt amount of a printhead and a deviation amount between chips according to the second embodiment.

FIG. 25 is a view showing a method of calculating the deviation amount between the printheads according to this embodiment. In this embodiment, C, M, and Y patterns and print patterns 1601 to 1606 as K patterns of reference patterns, and an inter-color deviation calculation method are the same as in FIG. 16 described in the first embodiment. In this embodiment, a print pattern 2517 by clear ink is printed by the pattern 2123 for pattern matching shown in FIG. 22. Therefore, K patterns 2507 to 2510 of the reference patterns corresponding to that pattern are also printed by the pattern 2123 for pattern matching.

As described above, according to this embodiment, the visibility is improved by using an inverted matching pattern as a test pattern printed by clear ink which is difficult to visually perceive. Furthermore, the accuracy of detection of clear ink is improved by also executing shading processing shown in FIG. 20 in the first embodiment.

In this embodiment, a pattern in which black and white are inverted is used as a matching pattern to improve the visibility of clear ink in terms of the ink color. However, the present invention is not limited to this in the ink color. If a difference in luminance value between the printing color and the background color of the print medium is small, the same effect is obtained even in, for example, thin ink. Furthermore, if a position at which an image is formed in a pattern is inverted to increase an area of clear ink and the visibility is improved, a size for pattern matching may be made equal between color ink and clear ink.

As described above, according to this embodiment, it is possible to obtain the same effect as in the first embodiment, and also improve the accuracy of detection of clear ink.

Third Embodiment

In this embodiment, a form using a test pattern different from that described in the first embodiment will be described. The same description as in the first embodiment will be omitted and the difference will be described in detail.

[Position Deviation Correction Method of Printhead]

Figure 26:
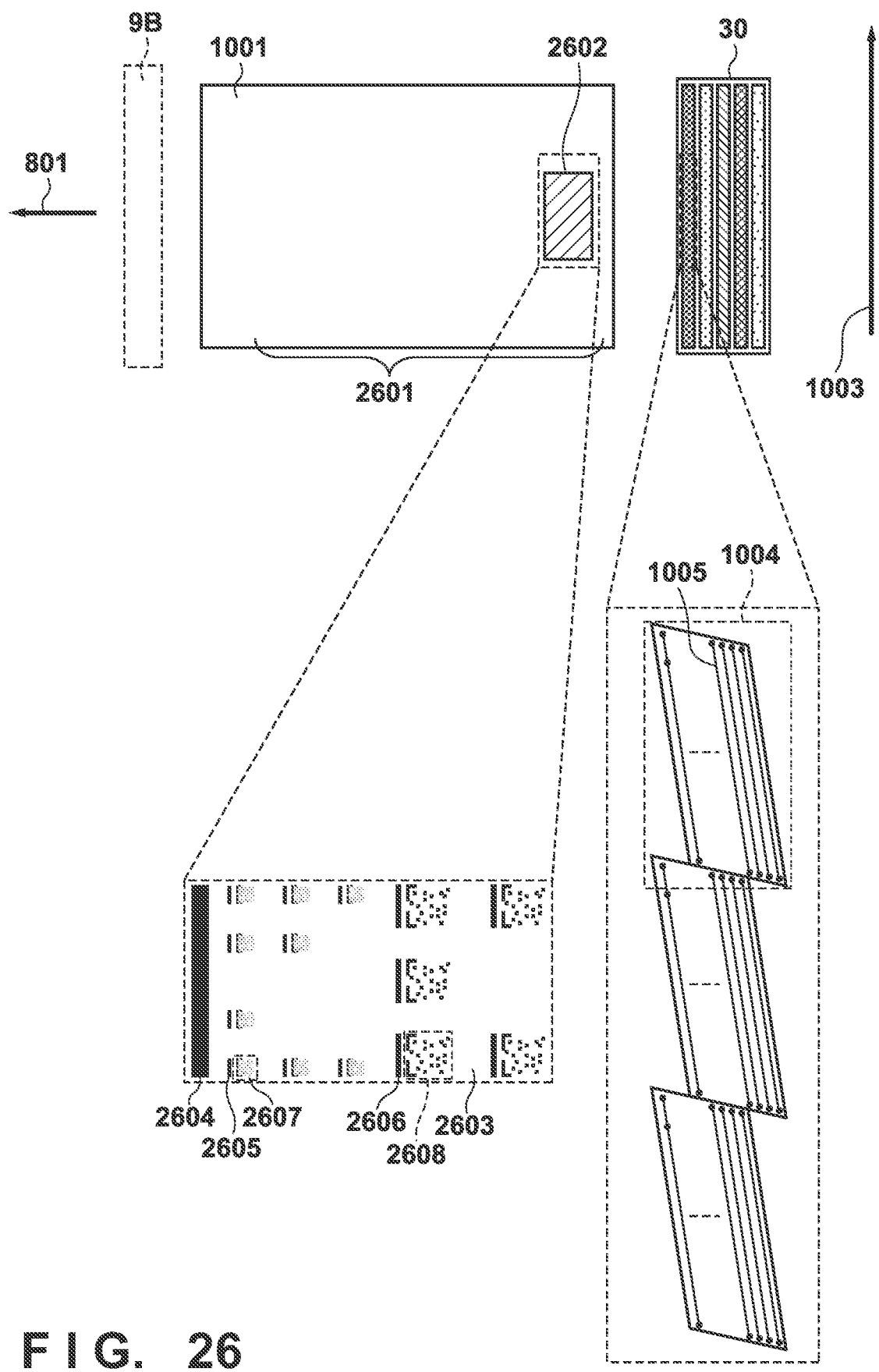
FIG. 26 is a view for explaining a test pattern for printhead position deviation correction according to the third embodiment.

FIG. 26 is a view for explaining a test pattern for position deviation correction of a printhead according to this embodiment. Components except for the test pattern are the same as those described with reference to FIG. 10 in the first embodiment.

A test pattern 2601 is a test pattern for performing printhead position deviation correction of a printhead 30. The test pattern 2601 according to this embodiment includes only a test pattern 2602 having the same arrangement as that of the test pattern 1011 described with reference to FIG. 13 in the first embodiment.

In this embodiment, a test pattern 2603 is a test pattern for calculating the deviation amount between the printheads, and is obtained by enlarging the test pattern 2602. Note that in an arrangement indicated by the test pattern 2603, the correspondence between the test pattern and the ink color according to the type of the printhead 30 may be changed. In the test pattern 2603, an area represented by black is an area printed by corresponding ink. An area represented by white is an area printed not by ink but by the background color of the print medium 1001.

The arrangement of the test pattern 2603 for calculating a deviation amount between the printheads and a printing method will now be described. The test pattern 2603 includes a detection mark 2604, alignment marks 2605 and 2606, and patterns 2607 and 2608 for pattern matching. The detection mark 2604 is a pattern used to detect the test pattern 2603 in image analysis processing when calculating a deviation amount between the printheads. The detection mark 2604 is a pattern printed in a shape of a rectangular area shown in FIG. 26.

Each alignment mark 2605 or 2606 is used to calculate the reference position of the analysis area of the pattern 2607 or 2608 for pattern matching in the image analysis processing. Each alignment mark 2605 or 2606 is printed in a shape of a rectangular area shown in FIG. 26. Each alignment mark 2605 or 2606 is printed by droplet ejection by a plurality of nozzle arrays for each pattern 2607 or 2608 for pattern matching corresponding to each nozzle array. Each pattern 2607 for pattern matching corresponds to each alignment mark 2605, and each pattern 2608 for pattern matching corresponds to each alignment mark 2606.

The patterns 2607 or 2608 for pattern matching are patterns for detecting the position deviation of the printhead 30 in the image analysis processing. The patterns 2607 or 2608 for pattern matching are used in accordance with a printing color or the type of the calculated deviation amount. The detailed layouts of the patterns 2606 and 2607 for pattern matching are the same as in FIG. 11 described in the first embodiment. A method of calculating a deviation amount between the printheads is the same as that described with reference to FIG. 16 in the first embodiment.

(Mark Detection Processing)

Figure 27:
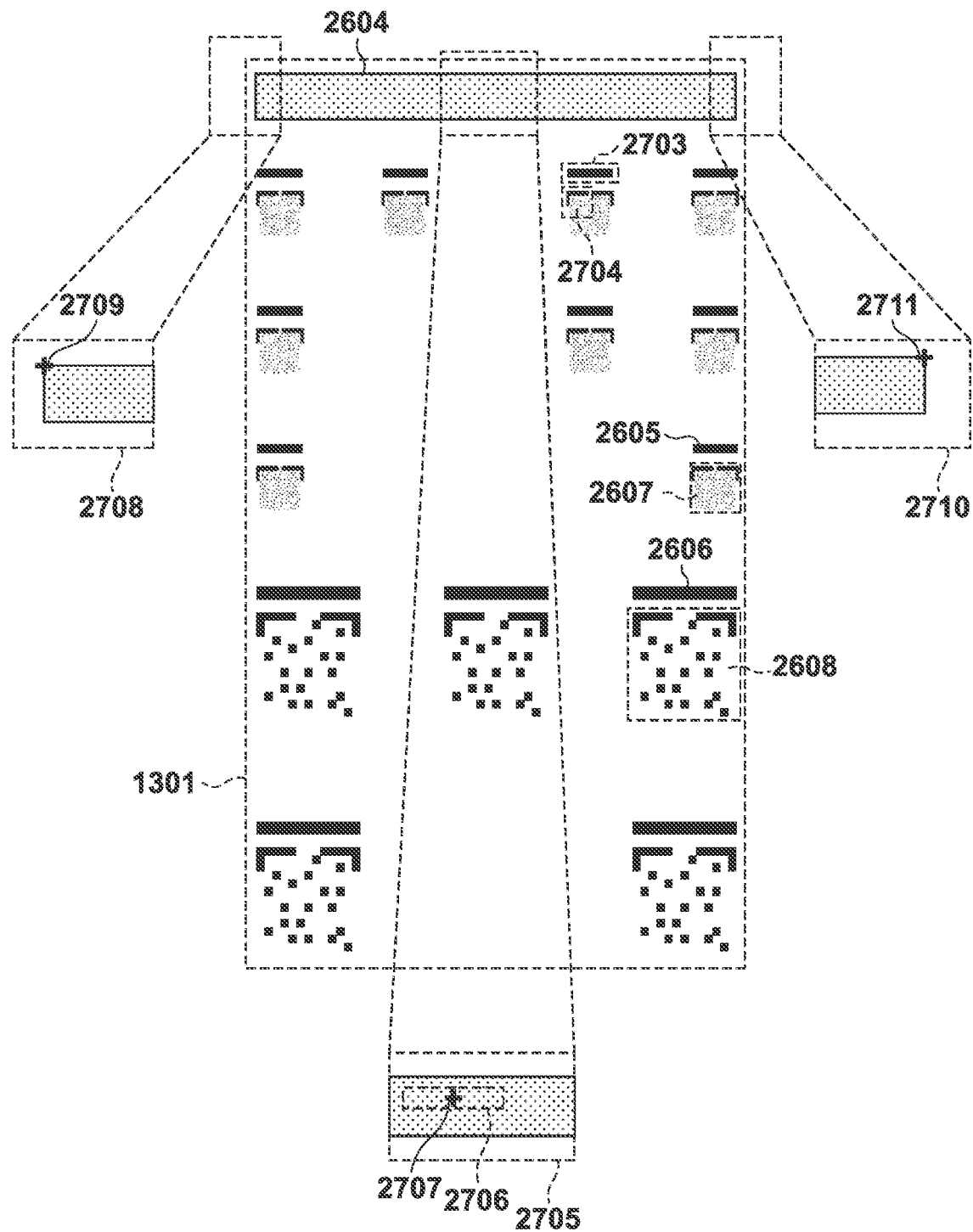
FIG. 27 is a view for explaining detection of a detection mark of a pattern corresponding to a print chip.

FIG. 27 is view for explaining mark detection processing corresponding to a print chip 1004. In this embodiment, processing of detecting the detection mark of each pattern corresponding to the print chip 1004 from a read image of a test pattern for deviation amount calculation will be described. FIG. 27 shows a test pattern for calculation of a deviation amount between the printheads, as indicated by a test pattern 1301 in FIG. 13. The mark detection processing will be described using this pattern.

The mark detection processing roughly includes three steps. In the first step, the detection mark 2604 is detected. The position of the test pattern 1301 is estimated based on the detected position of the detection mark 2604. In the second step, the alignment mark 2605 or 2606 is detected based on the estimated position of the test pattern described above. FIG. 27 shows an alignment mark 2703 as an example of the alignment mark 2605. Since a similar step is performed in detection processing of the alignment mark 2605 or 2606, the detection processing will be described using the alignment mark 2703 as an example of the alignment mark 2605. Since the alignment mark is printed near each pattern for pattern matching, the position of the corresponding pattern for pattern matching can be estimated based on the detected position of the alignment mark. The position of the corresponding pattern for pattern matching is estimated based on the position of the alignment mark 2703. In the third step, pattern position detection is performed using pattern matching based on the estimated position of the pattern for pattern matching in the second step.

The processing of detecting the detection mark 2604 in the first step will be described. This processing uses the luminance value of a channel in which the density is highest in the printing color of the printhead of the detection target pattern, among three R, G, and B channels of the image read by the inspection unit 9B. For example, the R channel is used when the color with the highest density is C (cyan), the G channel is used when the color with the highest density is M (magenta), and the B channel is used when the color with the highest density is Y (yellow). Note that one of the channels is designated and used for a printing color, such as K (black), whose density is high in all the channels.

2705 is a view obtained by partially enlarging the detection mark 2604. The detection mark 2604 is detected based on the average density of a predetermined area of the read image. A detection mark detection area 2706 is an area where the average density is obtained. If the average density obtained in the detection mark detection area 2706 is equal to or higher than a predetermined density, the area is specified as a detection mark area, and the central position of the area is set as a detection mark detection position 2707. The predetermined density used as a threshold or a range of the detection mark detection area may be changed.

Subsequently, the upper left end position and the upper right end position of a detection mark 2604 are detected. 2708 is a view obtained by enlarging the peripheral portion of the upper left end of the detection mark 2604, and 2710 is a view obtained by enlarging the peripheral portion of the upper right end of the detection mark 2604. An area where the density is equal to or higher than the predetermined density is scanned from the detection mark detection position 2707, and the upper left end portion of the area where the density is equal to or higher than the predetermined density is set as an upper left end position 2709 of the detection mark. Similarly, the upper right end portion of the area where the density is equal to or higher than the predetermined density is set as an upper right end position 2711 of the detection mark. An alignment mark detection range is estimated by calculating the center of gravity of the density of a predetermined area from the position decided based on the upper left end position 2709 of the detection mark. It is possible to estimate, for example, a detection range of the alignment mark 2703 by detecting the detection mark 2604 of the test pattern 2603 shown in FIG. 26. Similar to the detection processing of the detection mark 2604, the detection processing of the alignment mark 2703 detects the position of the alignment mark 2703 by scanning an area where the density is equal to or higher than the predetermined density, and calculating the center of gravity of the density of the area.

Subsequently, the position of the pattern for pattern matching is estimated. The area 2704 is an area indicating the upper left end position of the pattern for pattern matching. Furthermore, the detection result of the detection mark 2604 is used to judge a specific chip of a specific printhead corresponding to the pattern. The final position of the pattern for pattern matching on the image is detected by roughly deciding the position by the above processing and then performing position detection processing including pattern matching processing. The position of the pattern for pattern matching on the image is a position at which a distance used to calculate a printhead position deviation amount is calculated. The various deviation amounts include a manufacturing error between the nozzle arrays, a manufacturing error between the print chips, the tilt of the printhead, and the position deviation between the printheads.

[Processing Procedure]

Figure 28:
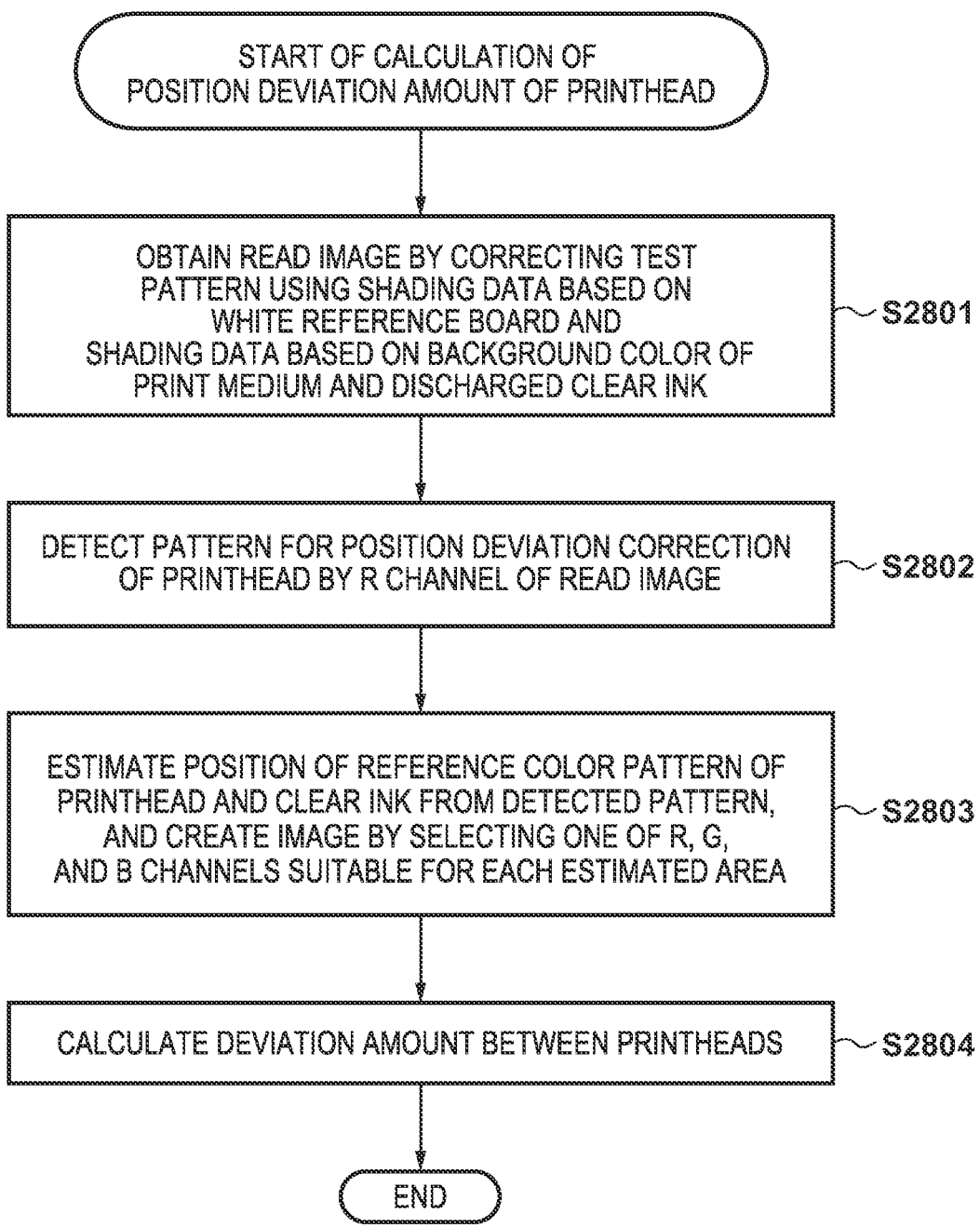
FIG. 28 is a flowchart illustrating a deviation amount calculation procedure according to the third embodiment.

FIG. 28 is a flowchart for explaining the procedure of reading each pattern and analyzing the pattern according to this embodiment. That is, FIG. 28 is a flowchart illustrating printhead position deviation amount calculation processing for performing correction using the test pattern 2601 for printhead position deviation correction printed on a print medium 1001. In the processing procedure, the respective control units of an engine controller 13B perform processes in cooperation with each other. When this processing starts, the test pattern 2601 has already been printed on the print medium 1001.

In step S2801, an inspection unit 9B reads the test pattern 2601 for printhead position deviation correction printed on the print medium 1001. At this time, the inspection unit 9B corrects the read test pattern 2601 using shading data created by a plurality of methods, and reads an image. In this embodiment, the inspection unit 9B reads a white reference board (not shown) as a white reference, and creates the first shading data based on the reading result. Furthermore, the inspection unit 9B reads the background color of the print medium 1001 and the ink color such that "a difference in luminance value between the ink color and the background color of the print medium is small", and creates the second shading data based on the reading result. This embodiment assumes that the ink color such that "a difference in luminance value between the ink color and the background color of the print medium is small" is clear ink. The value of the second shading data is a value between data obtained by reading the background color and data obtained by reading clear ink. If the data is a luminance value, "data of background color>data of clear ink" is satisfied.

Then, the inspection unit 9B corrects the signal values of the R and G channels of the read test pattern 2601 by the first shading data, and sets the obtained data as the read image. In addition, the inspection unit 9B corrects the signal value of the B channel of the test pattern 2601 by the second shading data, and sets the obtained data as the read image. As described above, in step S2801, using the plurality of shading data created by the plurality of methods, one of the shading data is selected for each of the R, G, and B channels and used to correct image data. In this correction processing, data of a value lower than the value of the shading data is corrected to be the lowest luminance value (0 in this example). Assuming that "data of background color>shading data>clear ink" is satisfied, the value of the read data of clear ink is a value corresponding to the lowest luminance. Thus, the color of the image of clear ink is corrected to be close to black. With this arrangement, a difference in luminance between clear ink and the background color of the print medium 1001 is generated in the B channel of the read image, thereby making it possible to detect the correct printing position of the pattern.

The inspection unit 9B may start reading the test pattern 2601 after waiting for a predetermined time since the start of printing of the test pattern 2601. Alternatively, the inspection unit 9B may start reading the test pattern 2601 after conveying the print medium 1001 by a predetermined amount since the end of printing of the test pattern 2601. Reading ends when a predetermined number of sub-scanning lines are read after the start of reading.

In step S2802, an inspection control unit 15E detects the pattern for position deviation correction of the printhead 30 by the R channel of the read image. The detected pattern is the test pattern 1301 for position deviation between the printheads 30. In this embodiment, since the R channel is a channel for which correction is performed by the shading data (second shading data) created by reading the white reference board (not shown), it is possible to detect the position of the pattern.

In step S2803, the inspection control unit 15E estimates, from the test pattern 1301 for a position deviation between the printheads 30 detected in step S2802, the pattern position of the printhead 30 for which the position deviation amount of the printhead has not been calculated. The printhead 30 as a position deviation correction target corresponds to the ink color such that "a difference in luminance value between the ink color and the background color of the print medium is small", and corresponds to clear ink in this embodiment. Since the reference printhead for position deviation correction of the printhead 30 is the printhead of K ink in this embodiment, the positions of the patterns printed by the printheads of clear ink and K ink are estimated.

Pattern position estimation according to this embodiment will be described with reference to the accompanying drawings. The test pattern 1301 shown in FIG. 13 is a pattern for position deviation correction of the printhead 30. A layout 1302 shown in FIG. 13 indicates a printhead that forms each pattern for pattern matching included in the test pattern 1301. As described above, the pattern of the printhead 30 as a position deviation correction target according to this embodiment in step S2803 is the print pattern 1617, shown in FIG. 16, corresponding to clear ink. The patterns of printhead K as the reference printhead are the print patterns 1607 and 1608. The patterns of printhead K can be detected by the R channel of the R, G, and B signals corrected by the shading data (first shading data) obtained by reading the white reference board (not shown). As for clear ink, the pattern can be detected by the B channel of the R, G, and B signals corrected by the shading data (second shading data) based on the background color.

For the detection mark 2604 and the alignment marks described with reference to FIG. 26, the patterns are printed by printhead K as the reference printhead in the test pattern 1301 for position deviation correction of the printhead 30. In this embodiment, based on detection of the detection mark 2604 of the test pattern 1301, areas at rough positions of the print pattern 1607 or 1608 of printhead K and the print pattern 1617 of clear ink of the correction target printhead are estimated. Based on the estimated areas, a pixel of a channel of the R, G, and B signals, which is appropriate for ink of the printhead, is selected for each pixel of an image to undergo position deviation correction of the test pattern 1301, thereby creating image data corresponding to each channel. This image data is used to detect each pattern. This makes it possible to perform position deviation correction of the printhead by pattern detection using pattern matching with respect to both reference printhead K and the printhead of clear ink as a correction target printhead.

In step S2804, the inspection control unit 15E selects a pattern corresponding to position deviation correction of the printhead 30 of clear ink, and analyzes the tilt amount of the printhead. As an analysis method here, the method described with reference to FIG. 16 is used. A printing color to be analyzed is the printing color of the printhead detected by the channel corresponding to the printing color in accordance with the result of estimating the pattern position in step S2803. Upon completion of step S2804, calculation of the position deviation amount of the target printhead including clear ink of the printhead 30 is completed.

As described above, even if each of the patterns of some printing colors has a small difference in luminance value between the printing color and the background color of the print medium in an image obtained by reading a test pattern by a reading unit, it is possible to detect the correct printing position of each pattern. The processing in step S2802 can be implemented by performing one reading operation for the same pattern without performing a reading operation a plurality of times. It is possible to control the position of each printhead and ink discharge based on a deviation amount obtained by the above processing.

In the above description, R, G, and B signal values in an image are corrected using both the shading data (first shading data) created by reading the white reference board and the shading data (second shading data) created by reading the printing color and the background color of the print medium 1001. A pattern is then detected using the corrected R, G, and B signal values. This method can detect, by one reading operation, the correct printing positions of the patterns of each printing color read using one of the R, G, and B channels of the read image corrected by the white reference board and the printing color with a small difference in luminance value with respect to the background color of the print medium. This shortens the processing time, as compared with a case in which a reading operation is performed for the same print pattern a plurality of times. This also eliminates the influence, on the detection accuracy of the printing position of the pattern, of a reading error for each reading operation when performing printing position adjustment between different read images.

Fourth Embodiment

This embodiment will explain an example of changing a test pattern printed by clear ink in order to improve the visibility of a pattern printed by clear ink, with respect to the arrangement described in the third embodiment. Components except for the test pattern are similar to those in the third embodiment and a repetitive description will be omitted.

Figure 29:
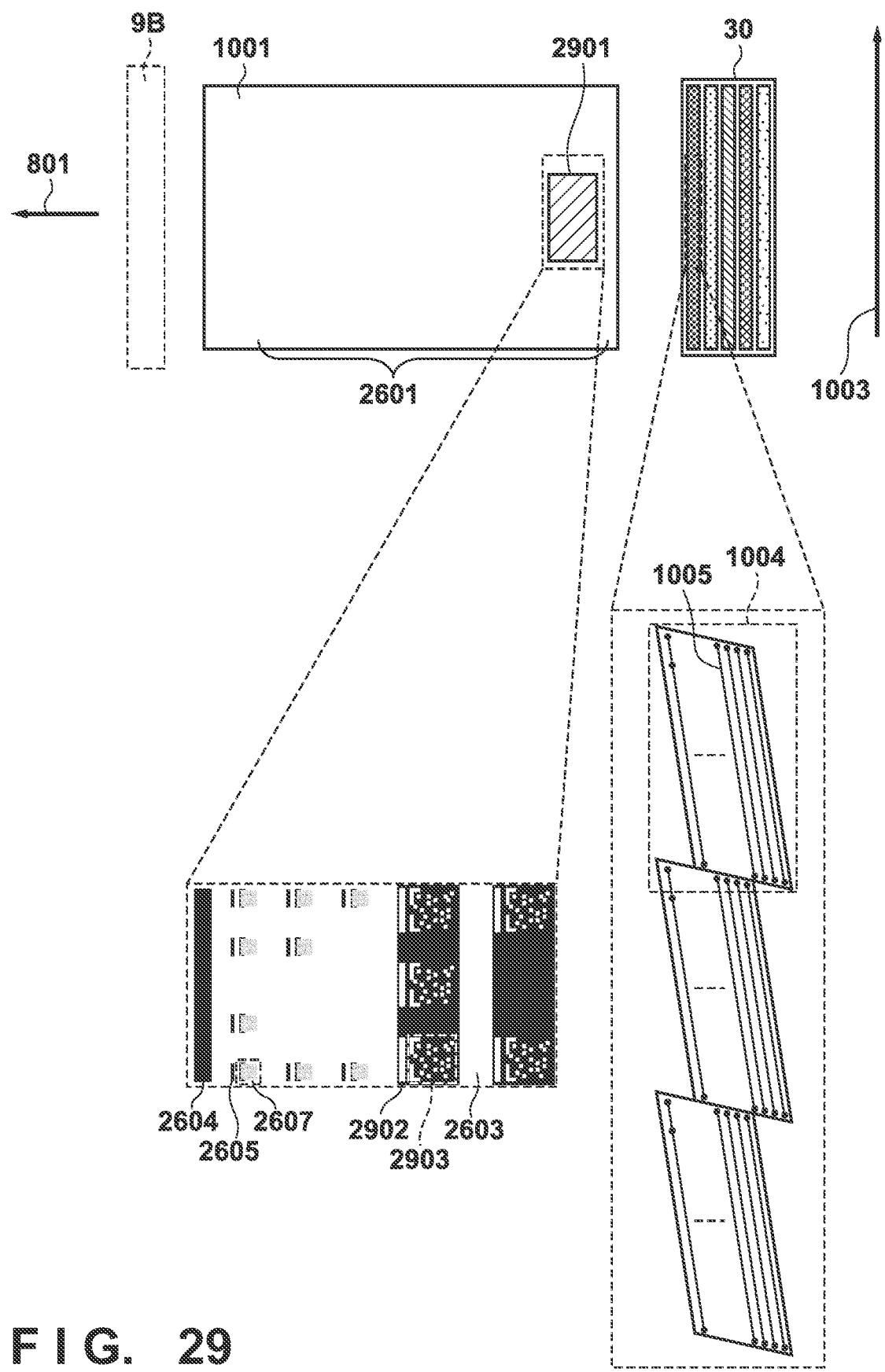
FIG. 29 is a view for explaining a test pattern for printhead position deviation correction according to the fourth embodiment.

FIG. 29 is a view for explaining a test pattern for position deviation correction of a printhead according to this embodiment. The difference from FIG. 26 described in the third embodiment is that alignment marks 2902 and patterns 2903 for pattern matching in a test pattern 2603 for calculating an inter-color deviation amount between printheads are changed. To improve the visibility of clear ink, the alignment marks 2902 and the patterns 2903 for pattern matching are inverted with respect to FIG. 26 in the third embodiment. Inversion increases the print area of the clear ink portion. A black portion is a portion printed using clear ink. A white portion is an unprinted portion, that is, a background portion of a print medium 1001. In each pattern 2903 for pattern matching, the pattern can be recognized by the white unprinted portion and the black portion printed by clear ink.

Details of each pattern 2903 for pattern matching are the same as in FIG. 22 described in the second embodiment.

The correspondence among print chips 1004 and a test pattern for performing inter-color deviation correction calculation between the printheads according to this embodiment is the same as in FIG. 24 described in the second embodiment. In this embodiment, the visibility of the test pattern for clear ink is improved, as compared with the third embodiment, by using the black/white inverted patterns 2903 for pattern matching. Note that a pattern similar to the pattern for pattern matching of a printing color of a deviation calculation target is used as the pattern of a reference printhead. The corresponding pattern for pattern matching may be changed in accordance with the color.

A method of calculating a deviation amount between the printheads according to this embodiment is the same as in FIG. 25 described in the second embodiment. In this embodiment, a print pattern 2517 by clear ink is printed by pattern 2903 for pattern matching, as shown in FIG. 22. Therefore, K patterns 2507 to 2510 of the reference patterns corresponding to that pattern are also printed by the pattern 2903 for pattern matching.

As described above, according to this embodiment, the visibility is improved by using an inverted matching pattern as a test pattern printed by clear ink which is difficult to visually perceive. Furthermore, while improving the accuracy of detection of clear ink by also executing shading processing shown in FIG. 28 in the third embodiment, it is possible to implement the processing by performing one reading operation for the same pattern without performing a reading operation a plurality of times.

In this embodiment, a black/white inverted pattern is used as a matching pattern to improve the visibility of clear ink in ink color. However, the present invention is not limited to this in terms of the ink color. If a difference in luminance value between the printing color and the background color of the print medium is small, the same effect is obtained even in, for example, thin ink. Furthermore, if a position at which an image is formed in a pattern is inverted to increase an area of clear ink and the visibility is improved, a size for pattern matching may be made equal between color ink and clear ink.

Other Embodiments

In each of the above embodiments, the print unit 3 includes the plurality of printheads 30 but may include one printhead 30. The printhead 30 need not be a full-line printhead, and may be a serial type printhead that forms an ink image by discharging ink from the printhead 30 while moving, in the Y direction, a carriage that detachably mounts the printhead 30.

A conveyance mechanism of a print medium P may adopt another method such as a method of nipping and conveying the print medium P by a pair of rollers. In the method of conveying the print medium P by the pair of rollers or the like, a roll sheet may be used as the print medium P, and a printed product P' may be formed by cutting the roll sheet after transfer.

In each of the above embodiments, the transfer member 2 is provided on the outer peripheral surface of the transfer drum 41. However, another method such as a method of forming a transfer member 2 into an endless swath and running it cyclically may be adopted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-148708, filed Aug. 7, 2018, and No. 2018-148709, filed Aug. 7, 2018, which are hereby incorporated by reference herein in their entirety.

What is claimed is:

1. An inkjet printing apparatus comprising:
   a printhead adopting an inkjet printing method;
   a reading device configured to read an image; and
   at least one processor and at least one memory configured to function as:
   a first creation unit configured to create first shading data using data of an image obtained by reading a white reference by the reading device;
   a first obtaining unit configured to obtain data of a first image by reading, by the reading device, a test pattern formed using a plurality of inks on a print medium by the printhead and correcting signal values of pixels in an image of the test pattern using the first shading data;
   a second obtaining unit configured to obtain data of an image of a background of the print medium by reading the print medium by the reading device;
   a third obtaining unit configured to obtain data of an image formed by a predetermined ink among the plurality of inks by reading the test pattern by the reading device;
   a second creation unit configured to create, using the data of the image of the background and the data of the image formed by the predetermined ink, second shading data having a value between a value of the data of the image of the background and a value of the data of the image formed by the predetermined ink;
   a fourth obtaining unit configured to obtain data of a second image by correcting, using the second shading data, the signal values of pixels in the image of the test pattern read by the reading device so that the signal value of a pixel lower than a value of the second shading data becomes a value corresponding to a lowest luminance;
   a specifying unit configured to specify an area of a pattern of each of the plurality of inks in the image of the test pattern using the data of the first image and the data of the second image; and
   a calculation unit configured to calculate a position deviation amount of the printhead based on a position of the pattern of the area specified by the specifying unit.

2. The apparatus according to claim 1, wherein
   the reading device reads an image using a signal value corresponding to each of a plurality of colors,
   the fourth obtaining unit obtains the second image by correcting, among the signal values of the plurality of colors included in the image of the test pattern read by the reading device, the signal value corresponding to a predetermined color using the second shading data, and
   the specifying unit specifies, using the signal value corresponding to the predetermined color in the second image corrected by the second shading data, an area of a pattern formed by the predetermined ink, and specifies, using the signal value corresponding to a color different from the predetermined color in the first image corrected by the first shading data, an area of a pattern formed by ink different from the predetermined ink.

3. The apparatus according to claim 2, wherein the predetermined color is blue.

4. The apparatus according to claim 1, wherein the predetermined color is ink whose difference in luminance value with respect to the background of the print medium is smaller than a predetermined threshold.

5. The apparatus according to claim 1, wherein
   the test pattern includes a first pattern formed by the predetermined ink and a second pattern formed by ink different from the predetermined ink, and
   a size of the first pattern is larger than a size of the second pattern.

6. The apparatus according to claim 5, wherein the first pattern and the second pattern are inverted in terms of a position at which formation by ink is performed and a position at which no formation by ink is performed.

7. The apparatus according to claim 1, further comprising:
   a correction unit configured to correct, with respect to the data of the image of the test pattern read by the reading device, a signal value corresponding to a first color using the first shading data and a signal value corresponding to a second color using the second shading data so that data of a value lower than the value of the second shading data becomes the value corresponding to the lowest luminance; and a second specifying unit configured to specify, using the signal value corrected by the correction unit, an area of a pattern formed by each of the plurality of inks in the image of the test pattern.

8. The apparatus according to claim 7, wherein the second specifying unit specifies an area of the first color using the signal value corresponding to the first color corrected using the first shading data, and specifies, by estimating an area formed by the predetermined ink based on a position of the area of the first color and an arrangement of the test pattern, a second area formed by the predetermined ink with respect to the estimated area using the signal value corresponding to the second color corrected using the second shading data.

9. The apparatus according to claim 7, wherein
the first color is red, and
the second color is blue.

10. The apparatus according to claim 1, wherein the predetermined ink is clear ink.

11. The apparatus according to claim 1, further comprising an adjustment unit configured to adjust a position deviation of the printhead using the position deviation amount calculated by the calculation unit.

12. The apparatus according to claim 11, wherein position deviation correction by the adjustment unit includes one of position deviation correction between printheads, position deviation correction between print chips included in a printhead, and position deviation correction between nozzle arrays in a print chip.

13. The apparatus according to claim 1, wherein the printhead comprises a plurality of printheads.

14. An inkjet printing apparatus comprising:
a printhead adopting an inkjet printing method;
a reading device configured to read an image; and
at least one processor and at least one memory configured to function as:
a first creation unit configured to create first shading data using data of an image obtained by reading a white reference by the reading device;
a first obtaining unit configured to obtain data of an image of a background of a print medium by reading the print medium by the reading device;
a second obtaining unit configured to obtain data of an image formed by a predetermined ink among a plurality of inks by reading, by the reading device, a test pattern formed using the plurality of inks on the print medium by the printhead;
a second creation unit configured to create second shading data using the data of the image of the background and the data of the image formed by the predetermined ink;
a correction unit configured to correct, with respect to the data of the image of the test pattern read by the reading device, a signal value corresponding to a first color using the first shading data and a signal value corresponding to a second color using the second shading data so that data of a value lower than a value of the second shading data becomes a value corresponding to a lowest luminance;
a specifying unit configured to specify, using the signal value corrected by the correction unit, an area of a pattern formed by each of the plurality of inks in the image of the test pattern; and
a calculation unit configured to calculate a printing position deviation amount on the print medium between the plurality of inks based on a position of the pattern of the area specified by the specifying unit.

15. The apparatus according to claim 14, wherein the specifying unit specifies an area of the first color using the signal value corresponding to the first color corrected using the first shading data, and specifies, by estimating an area formed by the predetermined ink based on a position of the area of the first color and an arrangement of the test pattern, a second area formed by the predetermined ink with respect to the estimated area using the signal value corresponding to the second color corrected using the second shading data.

16. The apparatus according to claim 14, wherein
the first color is red, and
the second color is blue.

17. A control method for an inkjet printing apparatus including a printhead adopting an inkjet printing method and a reading device, comprising:
creating first shading data using data of an image obtained by reading a white reference by the reading device;
obtaining data of a first image by reading, by the reading device, a test pattern formed using a plurality of inks on a print medium by the printhead and correcting signal values of pixels in an image of the test pattern using the first shading data;
obtaining data of an image of a background of the print medium by reading the print medium by the reading device;
obtaining data of an image formed by a predetermined ink among the plurality of inks by reading the test pattern by the reading device;
creating, using the data of the image of the background and the data of the image formed by the predetermined ink, second shading data having a value between a value of the data of the image of the background and a value of the data of the image formed by the predetermined ink;
obtaining data of a second image by correcting, using the second shading data, the signal values of pixels in the image of the test pattern read by the reading device so that the signal value of a pixel lower than a value of the second shading data becomes a value corresponding to a lowest luminance;
specifying an area of a pattern of each of the plurality of inks in the image of the test pattern using the data of the first image and the data of the second image; and
calculating a position deviation amount of the printhead based on a position of the pattern of the specified area.

* * * * *